US011516090B2

(12) United States Patent
Örtenblad et al.

(10) Patent No.: US 11,516,090 B2
(45) Date of Patent: Nov. 29, 2022

(54) OPEN NETWORK AUTOMATION PLATFORM (ONAP)—FIFTH GENERATION CORE (5GC) INTERACTION FOR ANALYTICS

(71) Applicant: Telefonaktiebolaget LM Ericsson (publ), Stockholm (SE)

(72) Inventors: Helen Örtenblad, Gothenburg (SE); Ulf Mattsson, Kungsbacka (SE); Miguel Angel Puente Pestaña, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 129 days.

(21) Appl. No.: 17/260,939

(22) PCT Filed: Jul. 17, 2019

(86) PCT No.: PCT/SE2019/050699
§ 371 (c)(1),
(2) Date: Jan. 15, 2021

(87) PCT Pub. No.: WO2020/018012
PCT Pub. Date: Jan. 23, 2020

(65) Prior Publication Data
US 2021/0288886 A1    Sep. 16, 2021

Related U.S. Application Data

(60) Provisional application No. 62/699,540, filed on Jul. 17, 2018.

(51) Int. Cl.
H04L 41/0894    (2022.01)
H04L 41/40    (2022.01)
(Continued)

(52) U.S. Cl.
CPC .............. H04L 41/145 (2013.01); G06F 8/60 (2013.01); H04W 8/18 (2013.01); H04W 24/08 (2013.01); H04W 24/10 (2013.01); H04W 40/02 (2013.01)

(58) Field of Classification Search
None
See application file for complete search history.

(56) References Cited

U.S. PATENT DOCUMENTS

| 2017/0019291 | A1 | 1/2017 | Tapia et al. | |
| 2017/0353361 | A1* | 12/2017 | Chopra | G06F 9/45558 |
| 2020/0187277 | A1* | 6/2020 | Lee | H04W 28/02 |

FOREIGN PATENT DOCUMENTS

| CN | 110636552 A | * | 12/2019 | ............ H04W 28/08 |
| WO | WO-2018068863 A1 | * | 4/2018 | ......... H04L 67/1008 |
| WO | WO-2018203780 A1 | * | 11/2018 | |

OTHER PUBLICATIONS

Author Unknown, "Technical Specification Group Services and System Aspects; System Architecture for the 5G System; Stage 2 (Release 15)," Technical Specification 23.501, Version 15.1.0, 3GPP Organizational Partners, Mar. 2018, 201 pages.
(Continued)

*Primary Examiner* — Ajit Patel
(74) *Attorney, Agent, or Firm* — Withrow & Terranova, PLLC

(57) ABSTRACT

Methods and systems for Open Network Automation Platform (ONAP) Fifth Generation Core (5GC) interaction for analytics are provided. According to one aspect, a method, performed by a Front End node for receiving patterns extracted from events and current network status data in a telecommunications network, comprises: receiving, from a
(Continued)

Session Management Function (SMF) a request for a User Plane Function (UPF) selection recommendation for a user; determining a list of applications associated with the user; sending, to a Data Collection, Analytics, and Events (DCAE) function of an ONAP, a request for a list of Application Server (AS) locations; receiving, from the DCAE function, the list of AS locations; selecting a UPF based on the user's mobility and application usage patterns; and sending, to the SMF, a recommendation identifying the selected UPF.

22 Claims, 19 Drawing Sheets

(51) Int. Cl.
    *H04L 41/14* (2022.01)
    *G06F 8/60* (2018.01)
    *H04W 8/18* (2009.01)
    *H04W 24/08* (2009.01)
    *H04W 24/10* (2009.01)
    *H04W 40/02* (2009.01)

(56) References Cited

OTHER PUBLICATIONS

Author Unknown, "Technical Specification Group Services and System Aspects; Policy and Charging Control Framework for the 5G System; Stage 2 (Release 15)," Technical Specification 23.503, Version 15.2.0, 3GPP Organizational Partners, Jun. 2018, 67 pages.
Author Unknown, "Draft Report of TSG SA meeting #80," Third Generation Partnership Project (3GPP), TSG SA Meeting #80, Version 0.0.2, Jun. 13-15, 2018, 90 pages, La Jolla, California, USA.
Singh, Sukhdeep et al., "SPEAD: Smart P-GW for Enhanced Access Discovery and selection for NGCN," IEEE 20th International Conference on High Performance Computing and Communications; OEEE 16th International Conference on Smart City; IEEE 4th International Conference on Data Science and Systems, 2018, pp. 449-456.
Slim, Farah et al., "Towards a Dynamic Adaptive Placement of Virtual Network Functions under ONAP," Third International Workshop on Orchestration for Software-Defined Infrastructures (NFV-SDN), 2017 pp. 210-215.
International Search Report and Written Opinion for International Patent Application No. PCT/SE2019/050699, dated May 14, 2020, 11 pages.

* cited by examiner

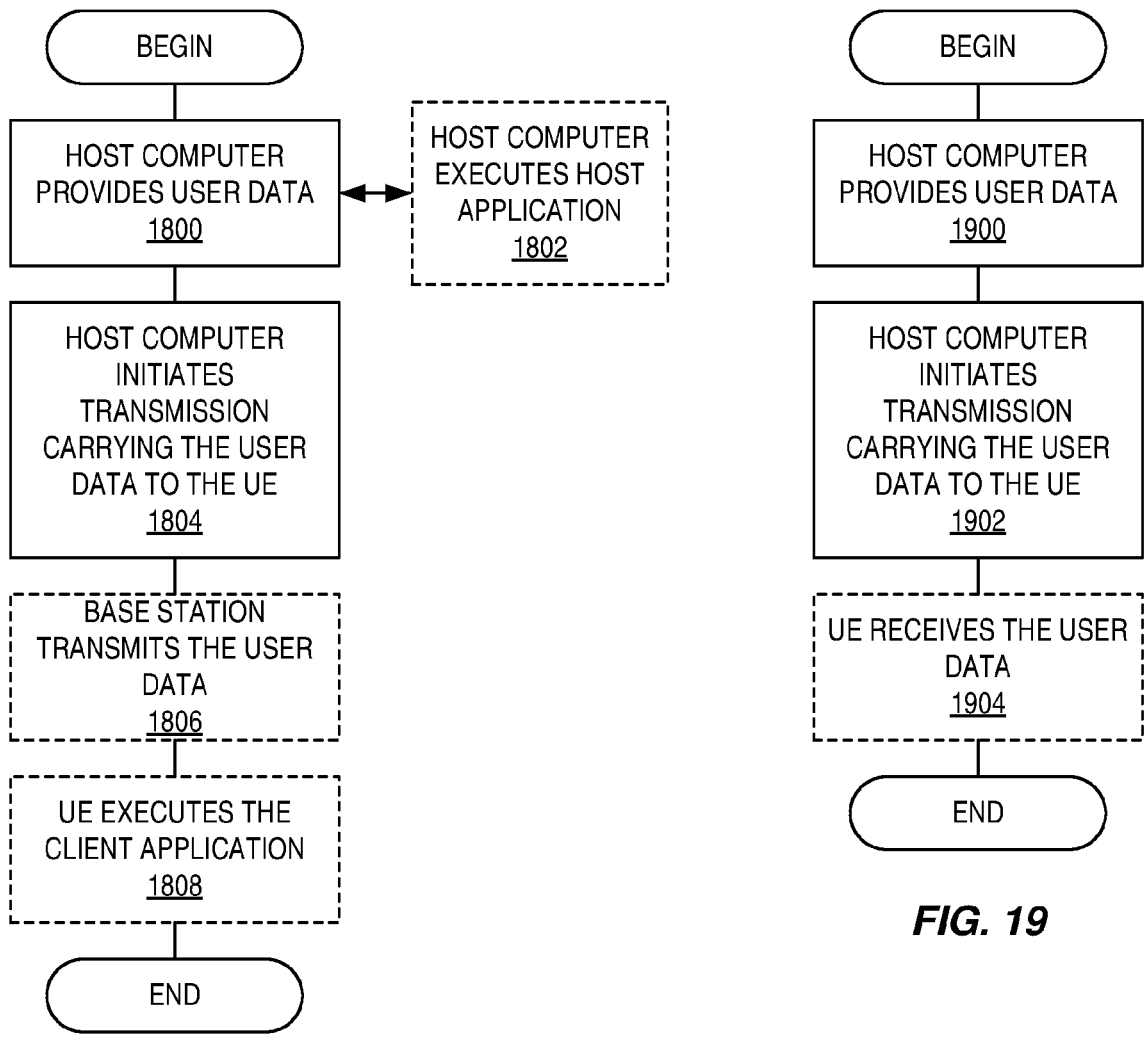

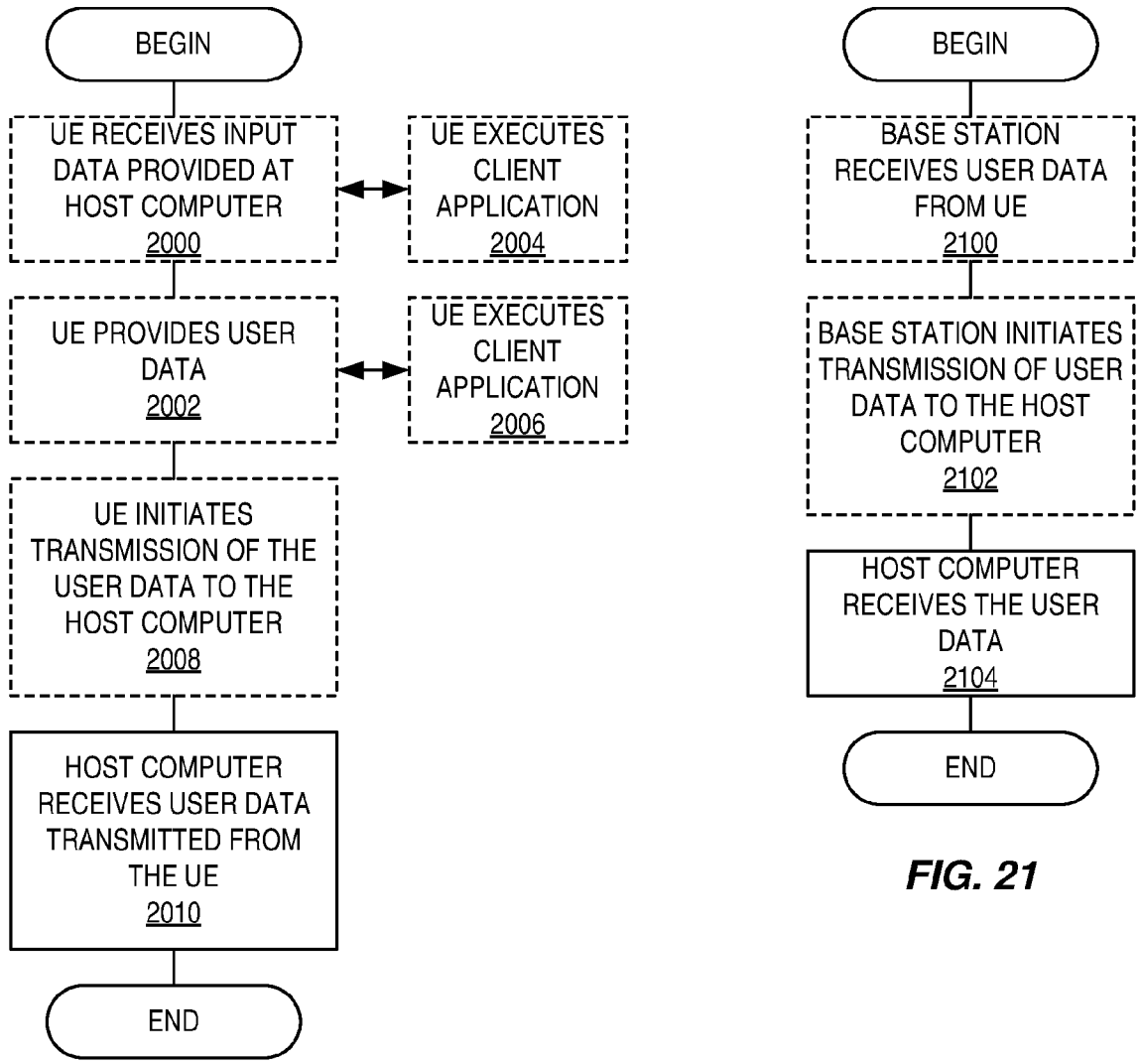

OPEN NETWORK AUTOMATION PLATFORM (ONAP)—FIFTH GENERATION CORE (5GC) INTERACTION FOR ANALYTICS

RELATED APPLICATIONS

This application is a 35 U.S.C. § 371 national phase filing of International Application No. PCT/SE2019/050699, filed Jul. 17, 2019, which claims the benefit of provisional patent application Ser. No. 62/699,540, filed Jul. 17, 2018, the disclosures of which are hereby incorporated herein by reference in their entireties.

TECHNICAL FIELD

The present disclosure relates to network automation, and particularly to optimal decisions regarding User Plane Function (UPF) selection, UPF onboarding and Application Server (AS) onboarding, and Life Cycle Management (LCM).

BACKGROUND

Network Data Analytics Function (NWDAF)

FIG. 1 illustrates a Third Generation Partnership Project (3GPP) Fifth Generation Core Network (5GC) Service-Based Architecture (SBA), which is a network architecture using service-based interfaces between Network Functions (NFs) in the control plane. An NF may be implemented either as a network element on a dedicated hardware, as a software instance running on a dedicated hardware, or as a virtualized function instantiated on an appropriate platform, e.g., a cloud infrastructure.

The NFs shown in FIG. 1 include a Network Slice Selection Function (NSSF), a User Data Repository (UDR), a Network Exposure Function (NEF), a NWDAF, an Application Function (AF), a Policy Control Function (PCF), an Online Charging System (OCS), an Authentication Server Function (AUSF), an Access and Mobility Management Function (AMF), and a Session Management Function (SMF). FIG. 1 also includes a Radio Access Network (RAN), and a User Plane Function (UPF) that connects to a Data Network (DN). In FIG. 1, at least one User Equipment (UE) is connected to the network.

A brief description of some of the components of the Fifth Generation (5G) architecture:
- UE—The terminal, where the Front End of the application runs. Attached via radio channel to the base station.
- RAN—The radio access point. In Edge Cloud (EC) scenarios, it can host the EC platform, allowing EC applications to be directly deployed and executed at the base station site.
- UPF—The User Plane Function. The gateway that routes the traffic towards the EC platform and the central DN. It can be collocated within the base station or as a standalone component.
- AMF—The entity in charge of UE access and mobility management.
- SMF—The entity in charge of Session Management for the UE communications. It establishes, handles, and releases the so-called Protocol Data Unit (PDU) sessions. It selects the UPF(s) for the user traffic and provides it with instructions for routing, according to local or external policies (e.g., from a PCF).
- PCF—The entity that supports a unified policy framework to govern network behavior. It provides policy rules to the control plane function(s) so that they are enforced, e.g. charging, Quality of Service (QoS), and traffic steering policies.
- UDR—The entity in charge of storing the information of subscriber profiles; the authentication credential repository, etc.

For further information on the architecture entities please refer to the 3GPP Technical Specification (TS) 23.501, "Technical Specification Group Services and System Aspects; System Architecture for the 5G System; Stage 2 (Release 15)" (hereinafter, "3GPP TS 23.501").

The service(s) that a NF provides to other authorized NFs can be exposed to the authorized NFs through the service-based interface. In FIG. 1 the service-based interfaces are indicated by the letter "N" followed by the name of the NF in lower case, e.g. Namf for the service-based interface of the AMF and Nsmf for the service-based interface of the SMF, etc.

Some properties of the NFs shown in FIG. 1 may be described in the following manner.

The AMF provides UE-based authentication, authorization, mobility management, etc. A UE that is using multiple access technologies is basically connected to a single AMF because the AMF is independent of the access technologies.

The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session.

The AF provides information on the packet flow to the PCF responsible for policy control in order to support QoS.

The PCF uses the information provided by the AF to determine policies about mobility and session management to make the AMF and SMF operate properly.

The AUSF supports authentication function for UEs or similar and thus stores data for authentication of UEs or similar.

The UDM stores subscription data of the UE.

The DN, not part of the 5G core network, provides Internet access or operator services and similar.

NWDAF is a new NF being standardized by 3GPP for 5GC. NWDAF represents operator managed network analytics logical function. NWDAF provides slice specific network data analytics to the PCF and NSSF. NWDAF provides network data analytics (i.e., load level information) to the PCF and NSSF on a network slice level and the NWDAF is not required to be aware of the current subscribers using the slice. NWDAF notifies/publishes slice specific network status analytic information to the PCF(s) and NSSF that are subscribed to it. The PCF(s) and NSSF can directly collect slice specific network status analytic information from NWDAF. This information is not subscriber specific. The PCF uses that data in its policy decisions.

The NSSF may use the load level information provided by NWDAF for slice selection.

NWDAF sits in the SBA and offers the following services:

| Service Name | Service Operations | Operation Semantics | Example Consumer(s) |
| --- | --- | --- | --- |
| Nnwdaf_EventsSubscription | Subscribe Unsubscribe Notify | Subscribe/ Notify | PCF, NSSF PCF, NSSF PCF, NSSF |
| Nnwdaf_AnalyticsInfo | Request | Request/ Response | PCF, NSSF |

Nnwdaf_EventsSubscription Service

Service Description: this service enables the consumer to subscribe/unsubscribe for load events notification of Network Slice instance. Periodic notification and notification upon threshold exceeded can be subscribed.

Nnwdaf_EventsSubscription_Subscribe service operation
Description: Subscribes to NWDAF event with specific parameters.
Inputs Required: Identifier of Network Slice instance.
Inputs, Optional: Periodicity, load level threshold value.
Outputs Required: Confirmation of the Subscription.

Nnwdaf_EventsSubscription Unsubscribe service operation
Description: unsubscribe to NWDAF event with specific parameters.
Inputs, Required: Identifier of Network Slice instance.
Inputs, Optional: Periodicity, load level threshold value.
Outputs Required: Confirmation of the unsubscription.

Nnwdaf_EventsSubscription_Notify service operation
Description: NWDAF notifies the consumer instance of the event that has subscribed to the specific NWDAF service. Depending upon type of subscription this notification is either on a periodic basis or triggered whenever a threshold is crossed.
Inputs Required: Identifier of Network Slice instance, Load level information of Network Slice instance.
Inputs, Optional: Periodicity, load level threshold value.
Outputs Required: Confirmation of the unsubscription.

Nnwdaf_Analytics_Info Service

Service description: this service enables the consumer to request and get from NWDAF load level information of Network Slice instance.

| Service Description | Parameters |
| --- | --- |
| Request for load level information of particular Network Slice instance. These represent the information that have a meaning only in its network. | Request: Analytic ID identifying the load level information of particular Network Slice instance with the identification information of the corresponding slice explicitly or implicitly Response: Requested Analytic |

Nnwdaf_AnalyticsInfo_Request service operation
Description: the consumer requests NWDAF operator specific analytics.
Inputs Required: Analytic Identifier (ID) identifying the requested load level information of Network Slice instance. The request includes parameters listed in Table 5.x.x-2 for the specific NWDAF service being requested.
Inputs, Optional: None.
Outputs Required: Analysis with parameters indicated in Table 5.2.11.3.1-1.

Local Data Networks

Local Data Networks enable operator and 3rd party services to be hosted close to the UE's access point of attachment, so as to achieve an efficient service delivery through the reduced end-to-end latency and load on the transport network.

The 5GC selects a UPF close to the UE and executes the traffic steering from the UPF to the local Data Network via a N6 interface. This may be based on the UE's subscription data, location, policy, or other related traffic rules.

Due to user or application mobility, service or session continuity may be required based on the requirements of the service or the 5G network.

FIG. 2 illustrates a wireless communication system represented as a 5G network architecture composed of core NFs, where interaction between any two NFs is represented by a point-to-point reference point/interface.

Seen from the access side, the 5G network architecture shown in FIG. 2 comprises one or more UEs connected to either a RAN or an Access Network (AN) as well as to an AMF. Typically, the [R]AN comprises base stations, e.g. such as enhanced or evolved Node Bs (eNBs) or 5G base stations (gNBs) or similar. Seen from the core network side, the 5G core NFs shown in FIG. 2 include a NSSF, an AUSF, a Unified Data Management (UDM), an AMF, an SMF, a PCF, and an AF.

Reference point representations of the 5G network architecture are used to develop detailed call flows in the normative standardization.

N1 is the reference point for the connection between a UE and an AMF, and is defined to carry signaling between the UE and AMF.

N2 is the reference point for the connection between a RAN and an AMF.

N3 is the reference point for the connection between the RAN and the UPF.

N4 is the reference point for the connection between an SMF and a UPF, and is used by the SMF and UPF so that the UPF can be set using the control signal generated by the SMF, and the UPF can report its state to the SMF.

N5 is the reference point for the connection between a PCF and an AF.

N6 is the reference point for the connection between a UPF and a DN.

N7 is the reference point for the connection between an SMF and a PCF.

N8 is the reference point for the connection between an AMF and a UDM.

N9 is the reference point for the connection between different UPFs.

N10 is the reference point for the connection between an SMF and a UDM.

N11 is the reference point for the connection between an AMF and an SMF.

N12 is the reference point for the connection between an AMF and an AUSF. N12 is required for the AMF to perform authentication of the UE.

N13 is the reference point for the connection between an AUSF and a UDM.

N14 is the reference point for the connection between different AMFs, respectively.

N15 is the reference point for the connection between an AMF and a PCF.

N15 and N7 are defined since the PCF applies policy to the AMF and SMF, respectively. N8 and N10 are defined because the subscription data of the UE is required for the AMF and SMF.

The 5GC aims at separating user plane and control plane. The user plane carries user traffic while the control plane carries signaling in the network. In FIG. 2, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separating the AMF and SMF allows independent evolution and scaling. Other control plane functions like the PCF and AUSF can be separated as shown in FIG. 2. Modularized function design enables the 5GC to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

FIG. 2 depicts two DNs in the 5G architecture, one local and one central. The requirements to support Local Data Networks include:
  Local Routing: the 5GC selects the UPF to route the user traffic to the local DN.
  Traffic Steering: the 5GC selects the traffic to be routed to the Application Servers (ASs) in the local DN.
  Session and service continuity to enable UE and application (AS) mobility.
  User plane selection and reselection, e.g. based on input from AF.
  Network capability exposure: the 5GC and AF to provide information to each other via NEF.
  QoS and Charging: The PCF provides rules for QoS Control and Charging for the traffic routed to the local DN.

UPF Selection

The selection and reselection of the UPF are performed by the SMF by considering UPF deployment scenarios such as centrally located UPF and distributed UPF located close to or at the AN site. The selection of the UPF shall also enable deployment of UPF with different capabilities, e.g. UPFs supporting no or a subset of optional functionalities.

The SMF may be locally configured with the information about the available UPFs, e.g. by an Operation, Administration, and Maintenance (OA&M) system (which may also be referred to as an Operation and Maintenance (OAM) system) when the UPF is instantiated or removed.

UPF information can be updated (e.g., by the OAM) any time after the initial provisioning, or the UPF itself updates its information to the SMF any time after the node level interaction is established.

The UPF selection functionality in the SMF may optionally utilize the Network Repository Function (NRF) to discover UPF instance(s). In this case, the SMF issues a request to the NRF that may include following parameters: Data Network Name (DNN), Single Network Slice Selection Assistance Information (S-NSSAI). In its answer, the NRF provides the IP address or the Fully Qualified Domain Name (FQDN) of corresponding UPF instance(s) to the SMF and may also provide the SMF with additional information to aid UPF selection such as UPF location, UPF capacity, and UPF optional functionalities and capabilities.

The NRF may be configured by the OAM with information on the available UPF(s) or the UPF may register itself onto the NRF.

For home routed roaming case, the UPF(s) in a home Public Land Mobile Network (PLMN) is selected by SMF(s) in a Home PLMN (H-PLMN), and the UPF(s) in a visited PLMN is selected by SMF(s) in a Visited PLMN (V-PLMN). The exact set of parameters used for the selection mechanism is deployment specific and controlled by the operator configuration, e.g. location information may be used for selecting UPF in some deployments and may not be used in other deployments.

3GPP TS 23.501 states that the following parameter(s) may be considered by the SMF for the UPF selection:
  A UPFs dynamic load.
  A UPFs relative static capacity among UPFs supporting the same DNN.
  A UPF location available at the SMF.
  The UE's location information.
  A capability of the UPF and the functionality required for the particular UE session: An appropriate UPF can be selected by matching the functionality and features required for an UE.
  The DNN.
  The PDU Session Type (i.e. IPv4, IPv6, Ethernet Type or Unstructured Type) and if applicable, the static IP address/prefix.
  A Session and Service Community (SSC) mode selected for the PDU Session.
  The UE's subscription profile in UDM.
  The Data Network Access Identifier (DNAI) as included in the Policy and Charging Control (PCC) Rules and described in clause 5.6.7 of TS 23.501.
  Local operator policies.
  S-NSSAI.
  Access technology being used by the UE.

The SMF, when selecting a UPF for a PDU Session or when analysing whether to reselect a UPF of an ongoing PDU session, shall be able to use information such as:
  Information regarding the User Plane interfaces of UPF(s). This information may be acquired by the SMF using N4;
  Information regarding the N3 User Plane termination(s) of the AN serving the UE;
  Information regarding the N9 User Plane termination(s) of UPF(s) if needed;
  Information regarding the User plane termination(s) corresponding to the DNAI(s).

Open Network Automation Platform (ONAP)

ONAP is a platform that allows end user organizations and their network/cloud providers to collaboratively instantiate network elements and services in a dynamic, closed-loop process, with real-time response to actionable events. Two ONAP components relevant for the present disclosure are:
  An orchestration and control framework, including a Service Orchestrator (SO) and Controllers, that is recipe/policy-driven to provide automated instantiation of the service when needed and managing service demands in an elastic manner;
  An analytic framework that closely monitors the service behavior during the service lifecycle based on the specified design, analytics, and policies to enable response as required from the control framework, to deal with situations ranging from those that require healing to those that require scaling of the resources to elastically adjust to demand variations.

FIG. 3 illustrates an example ONAP architecture, with the above components highlighted:
The Data Collection, Analytics, and Events (DCAE) component collects performance, usage, and configuration data; provides computation of analytics; aids in troubleshooting; and publishes events, data, and analytics (e.g., to policy, orchestration, and the data lake);
The SO component executes the specified processes and automates sequences of activities, tasks, rules, and policies needed for on-demand creation, modification, or removal of network, application, or infrastructure services and resources. The SO provides orchestration at a very high level, with an end to end view of the infrastructure, network, and applications.

Problems with Existing Solutions

There currently exist certain challenge(s). The ONAP and 3GPP's 5GC are separate domains that deal with different aspects of the mobile network:
3GPP's 5GC handles the mobile network users' connectivity, i.e. mobility and user session management. It has knowledge about where the mobile user is, the services it's using, needed QoS, etc.
The ONAP handles the cloud orchestration of the network nodes. It manages the onboarding and Life Cycle Management (LCM) of the network nodes (which may be Virtual Network Functions (VNFs)). The ONAP can also handle the onboarding and LCM of ASs, running as Virtual Machines (VMs) or containers and sitting in the operator's domain (e.g., in edge clouds).

Both the ONAP and 5GC are aiming at network automation, i.e. to continuously receive events and current network status data, perform analytics on that data, extract insights or patterns, and provide feedback to the network so that it's able to take autonomous actions to adapt to changing or predicted conditions.

This separation between the ONAP and the 5GC poses several drawbacks when it comes to analytics and network automation:
The ONAP (by means of the DCAE) and the 5GC (by means of NWDAF) handle their own data separately, and it's not possible to have analytic insights correlating data from both parts.
There is no visibility to the ONAP of the 5GC mobile users' data. For example, their location, applications they are using, traffic characteristics, QoS requirements, what DNs they are connected to, etc.
There is no visibility to 5GC NFs (SMF, UPF, . . . ) of the VNF data, e.g. allocated Cloud resources, resource utilization, in which Cloud infrastructure they are deployed, etc.
The ONAP and 5GC network automation loops are decoupled, which leads to non-optimal action decisions.
The ONAP or 5GC, based on the outcome of analytics (from DCAE and NWDAF respectively), may decide to take an action that affects the other one, but the side taking the action:
Cannot take input from the other side to decide the optimal action
Cannot measure the impact provoked on the other side.

The present disclosure addresses the limitations of the following use cases:
UPF selection and traffic routing between Local and Central DNs. This is a decision taken in 5GC based on the data described in section 2.1.3. Some limitations of the current solution are for example:
Considering just the UPF location available at the SMF, since the SMF does not have the notion of the cloud infrastructure in which the UPF is deployed.
Considering just the UPFs load within the 5GC domain, since it does not consider the load of the cloud infrastructure.
Considering just the requested or predefined DNN or DNAI, since the ASs may be instantiated or removed dynamically in the different cloud infrastructures behind the local and central DNs.
UPF onboarding and LCM among the different Cloud infrastructures of an operator. These are decisions taken in the ONAP based on operator's policies. Some limitations of current solutions are for example:
Considering only static policies provided in the ONAP leads to non-optimal decisions since the mobile users have dynamic behavior when it comes to user mobility and application usage (they may use different applications with different QoS requirements).
AS onboarding and LCM in Edge Clouds within the operator's domain. These are decisions taken and configured in the ONAP. Some limitations of current solutions are for example:
Considering only static rules configured in the ONAP leads to non-optimal decisions in the sense of resource utilization in the local DNs, since the mobile users have dynamic mobility patterns and may be or move away from a certain Edge Cloud.

Summary

Methods and systems for Open Network Automation Platform (ONAP)—Fifth Generation Core (5GC) interaction for analytics are herein provided. A Network Data Analytics Function (NWDAF) provides to a Session Management Function (SMF) User Plane Function (UPF) selection and traffic routing patterns or recommendations, which may be based on the user location, user mobility pattern, application usage pattern, Application Server (AS) locations, AS load, UPF locations, and UPF load. There is combined interaction between an ONAP and an NWDAF or a processing Front-End part in the SMF and the ONAP. This interaction allows the NWDAF or the processing Front-End part in the SMF to get the needed information to produce the recommendations (AS location, AS load) and allows the NWDAF or the processing Front-End part in the SMF to request the ONAP to deploy UPFs and ASs if they are needed for an optimal UPF selection or traffic routing recommendation. The NWDAF or the processing Front-End part in the SMF provides the ONAP with AS onboarding recommendations for a certain application based on the existing AS locations and load, UPF locations and load, user mobility pattern, and application Quality of Service (QoS) requirements.

According to one aspect of the present disclosure, a method performed by a Front End node for receiving patterns extracted from events and current network status data in a telecommunications network comprises: receiving, from a SMF a request for a UPF selection recommendation for a user; determining a list of applications associated with the user; sending, to a Data Collection Analytics, and Events (DCAE) function of an ONAP a request for a list of AS locations; receiving, from the DCAE function, the list of AS locations; selecting a UPF based on the user's mobility and application usage patterns; and sending, to the SMF, a recommendation identifying the selected UPF.

In some embodiments, the Front End node performing the method comprises a NWDAF or a Network Function (NF) other than a NWDAF.

In some embodiments, the received request for a UPF selection recommendation comprises at least one of: information identifying the user; information identifying a New Radio Base Station (gNB); a list of at least one UPF; and a list of at least one Data Network Access Identifier (DNAI).

In some embodiments, the sent request for the list of AS locations comprises a list identifying at least one application associated with the user.

In some embodiments, the received list of AS locations comprises at least one of: information identifying an application; information identifying an AS; information identifying an AS location; a DNAI; and a Cloud-IDentifier (ID).

In some embodiments, the method further comprises, after receiving the list of AS locations and before selecting the UPF: sending, to a Service Orchestrator (SO) function of the ONAP, a UPF onboarding recommendation for requesting the ONAP to deploy a UPF in a cloud infrastructure; and receiving a response to the UPF onboarding recommendation indicating that the UPF is to be deployed or that the UPF is not to be deployed, wherein an indication that the UPF is to be deployed comprises a UPF-ID that identifies a UPF and an operation ID that identifies a UPF deployment operation.

In some embodiments, the method further comprises, after receiving the list of AS locations and before selecting the UPF: sending, to the SO function of the ONAP, an AS onboarding recommendation for requesting the ONAP to deploy an AS in a cloud infrastructure; and receiving, from the SO function, a response to the AS onboarding recommendation indicating that the AS is to be deployed or that the AS is not to be deployed, wherein an indication that the AS is to be deployed comprises an AS-ID that identifies an AS and an operation ID that identifies the AS deployment operation.

In some embodiments, the method further comprises, after receiving the list of AS locations and before selecting the UPF: sending, to the DCAE function, a request to get load information about one or more UPFs; and receiving, from the DCAE function, load information for the one or more UPFs, wherein the UPF selection is additionally based on the UPF load information.

According to one aspect of the present disclosure, a method performed by a Front End node for receiving patterns extracted from events and current network status data in a telecommunications network comprises: receiving, from an SMF, a request for a traffic routing recommendation for a user; determining a list of applications associated with the user; sending, to a DCAE function of an ONAP, a request for a list of AS locations; receiving, from the DCAE function, the list of AS locations; selecting, for each application, a UPF and DNAI based on the user's mobility and application usage patterns; and sending, to the SMF, a traffic routing recommendation comprising a list that maps each application to a recommended UPF and DNAI.

In some embodiments, the Front End node performing the method comprises a NWDAF or a NF other than a NWDAF.

In some embodiments, the received request for the traffic routing recommendation for the user comprises at least one of: information identifying the user; and information identifying a gNB.

In some embodiments, the sent request for the list of AS locations comprises a list identifying at least one application associated with the user.

In some embodiments, the received list of AS locations comprises at least one of: information identifying an application; information identifying an AS; information identifying an AS location; a DNAI; and a Cloud-ID.

In some embodiments, the method further comprises, after receiving the list of AS locations and before sending the traffic routing recommendation: sending, to a SO function of the ONAP, a UPF onboarding recommendation for requesting the ONAP to deploy a UPF in a cloud infrastructure; and receiving a response to the UPF onboarding recommendation indicating that the UPF is to be deployed or that the UPF is not to be deployed, wherein an indication that the UPF is to be deployed comprises a UPF-ID that identifies a UPF and an operation ID that identifies a UPF deployment operation.

In some embodiments, the method further comprises, after receiving the list of AS locations and before selecting the UPF: sending, to the SO function of the ONAP, an AS onboarding recommendation for requesting the ONAP to deploy an AS in a cloud infrastructure; and receiving, from the SO function, a response to the AS onboarding recommendation indicating that the AS is to be deployed or that the AS is not to be deployed, wherein an indication that the AS is to be deployed comprises an AS-ID that identifies an AS and an operation ID that identifies an AS deployment operation.

In some embodiments, the method further comprises, after receiving the list of AS locations and before selecting the UPF: sending, to the DCAE function, a request to get load information about one or more UPFs; and receiving, from the DCAE function, load information for the one or more UPFs, wherein the sent traffic routing recommendation is additionally based on the UPF load information.

According to one aspect of the present disclosure, a method performed by a Front End node for receiving patterns extracted from events and current network status data in a telecommunications network comprises: receiving, from a SO function of an ONAP a request for an AS onboarding recommendation, the request identifying an application; sending, to a DCAE function, of the ONAP, a request for status of one or more identified UPFs; receiving, from the DCAE function, the status for the one or more identified UPFs; determining an optimal number of AS and AS locations based on the identified application's users' mobility patterns and QoS, requirements; and sending, to the SO function, an AS onboarding recommendation, the AS onboarding recommendation including a list of AS locations.

In some embodiments, each AS location comprises a DNAI and/or a Cloud-ID.

In some embodiments, the method further comprises, prior to determining the optimal number of AS and AS locations: sending, to the SO function, a UPF onboarding recommendation message comprising a Cloud-ID or DNAI; and receiving from the SO function, an indication that the UPF is to be deployed or that the UPF is not to be deployed, wherein an indication that the UPF is to be deployed comprises a UPF-ID that identifies a UPF.

According to one aspect of the present disclosure, a method performed by a Front End node for receiving patterns extracted from events and current network status data in a telecommunications network comprises: sending, to a Back-End function that collects data from NFs, and other sources and extracts patterns, a request to receive a pattern; and receiving the pattern from the Back-End function.

In some embodiments, sending the request to receive a pattern comprises sending a pattern subscription request that identifies the pattern and specifies an update period and wherein receiving the identified pattern comprises receiving a pattern update notification after the specified update period.

In some embodiments, sending the request to receive a pattern comprises sending a pattern request that identifies the pattern and wherein receiving the pattern comprises receiving a pattern response that includes the identified pattern.

According to one aspect of the present disclosure, a method of operation of an SMF comprises: sending, to a Front End node that receives and analyses patterns of data collected from NFs, and other sources, a request for a UPF selection recommendation for a user; receiving, from the Front End node, a UPF selection recommendation; and selecting a UPF based on the received UPF selection recommendation.

In some embodiments, the received UPF selection recommendation comprises at least one of: information identifying the user; information identifying a gNB; a list of at least one UPF; and a list of at least one DNAI.

In some embodiments, the method further comprises receiving, from a SO function of an ONAP, a UPF deployment completion message, and performing a UPF reselection.

In some embodiments, the UPF deployment completion message comprises information identifying a UPF deployment operation and information identifying a UPF.

In some embodiments, the method further comprises receiving, from a SO function of an ONAP, an AS deployment completion message, and performing a UPF reselection.

According to one aspect of the present disclosure, a method of operation of an SMF comprises: sending, to a Front End node that receives and analyses patterns of data collected from NFs, and other sources, a request for a traffic routing recommendation; receiving, from the Front End node, a traffic routing recommendation; and selecting a UPF based on the received traffic routing recommendation.

In some embodiments, the received traffic routing recommendation comprises a list comprising at least one of: information identifying an application; information identifying a UPF; and information identifying a DNAI.

In some embodiments, the method further comprises sending, to the identified UPF, rules for starting the identified application.

In some embodiments, the method further comprises checking that the information identifying the application is mapped to a recommended UPF and DNAI.

In some embodiments, the method further comprises performing a UPF reselection.

According to one aspect of the present disclosure, a method of operation of an ONAP comprises: receiving, at a DCAE function of an ONAP, a request for a list of AS locations; and sending, by the DCAE function, a list of AS locations.

In some embodiments, the method further comprises: receiving, at a SO function of the ONAP, a UPF onboarding recommendation for requesting the ONAP to deploy a UPF in a cloud infrastructure; and sending, by the SO function, a response to the UPF onboarding recommendation indicating that the UPF is to be deployed or that the UPF is not to be deployed, wherein an indication that the UPF is to be deployed comprises a UPF-ID that identifies a UPF and an operation ID that identifies the UPF deployment operation.

In some embodiments, the method further comprises: receiving, from a SO function of the ONAP, an AS onboarding recommendation for requesting the ONAP to deploy an AS in a cloud infrastructure; and sending, by the SO function, a response to the AS onboarding recommendation indicating that the AS is to be deployed or that the AS is not to be deployed, wherein an indication that the AS is to be deployed comprises an AS-ID that identifies an AS and an operation ID that identifies the AS deployment operation.

In some embodiments, the method further comprises: receiving, at the DCAE function, a request to get load information about one or more UPFs; and sending, by the DCAE function, load information for the one or more UPFs.

In some embodiments, the method further comprises sending, from the SO function, a UPF deployment completion message comprising information identifying a UPF deployment operation and information identifying a UPF or an AS deployment completion message.

In some embodiments, the method further comprises sending, from the SO function, an AS deployment completion message comprising information identifying an AS deployment operation, information identifying a DNAI and information identifying an application.

According to one aspect of the present disclosure, a method of operation of an ONAP comprises: sending, from a SO function of the ONAP, a request for an AS onboarding recommendation, the request identifying an application; receiving, at a DCAE function of the ONAP, a request for status of one or more identified UPFs; sending, by the DCAE function, the status for the one or more identified UPFs; and receiving, at the SO function, an AS onboarding recommendation, the recommendation including a list of AS locations.

In some embodiments, each AS location comprises a DNAI and/or a Cloud-ID.

In some embodiments, the method further comprises: receiving, at the SO function, a UPF onboarding recommendation message comprising a Cloud-ID or DNAI; and sending by the SO function, an indication that the UPF is to be deployed or that the UPF is not to be deployed, wherein an indication that the UPF is to be deployed comprises a UPF-ID that identifies a UPF.

According to one aspect of the present disclosure, a Front End node for receiving patterns extracted from events and current network status data in a telecommunications network comprises one or more processors and memory storing instructions executable by the one or more processors, whereby the Front End node is operable to perform any of the Front End node methods described herein.

According to one aspect of the present disclosure, a SMF comprises one or more processors and memory storing instructions executable by the one or more processors, whereby the SMF node is operable to perform any of the SMF methods described herein.

According to one aspect of the present disclosure, an ONAP comprises one or more processors and memory storing instructions executable by the one or more processors, whereby the ONAP is operable to perform any of the ONAP methods described herein.

According to one aspect of the present disclosure, a system for providing ONAP-5GC interaction for analytics comprises: at least one telecommunication NF comprising logic that captures events and network status data; a Back-End function comprising circuitry that collects events and network status data from the at least one telecommunication NF and determines patterns within the collected data; and a Front-End function comprising circuitry that receives the patterns from the Back-End function and provides feedback and recommendations to a telecommunication network based on analysis of the received patterns.

In some embodiments, the Back-End function is a component of a NWDAF.

In some embodiments, the Front End function is a component within the at least one telecommunication NF.

In some embodiments, the Front End function has access to the events and network status data captured by the at least one telecommunication NF.

In some embodiments, the Front End function is collocated with the Back-End function.

In some embodiments, the Front End function has access to the data collected by the Back-End function.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 18 is a flowchart illustrating a method implemented in a communication system in accordance with some embodiments of the present disclosure;

FIG. 19 is a flowchart illustrating a method implemented in a communication system in accordance with some embodiments of the present disclosure;

FIG. 20 is a flowchart illustrating a method implemented in a communication system, in accordance with some embodiments of the present disclosure; and FIG. 21 is a flowchart illustrating a method implemented in a communication system, in accordance with some embodiments of the present disclosure.

DETAILED DESCRIPTION

Figure 1:
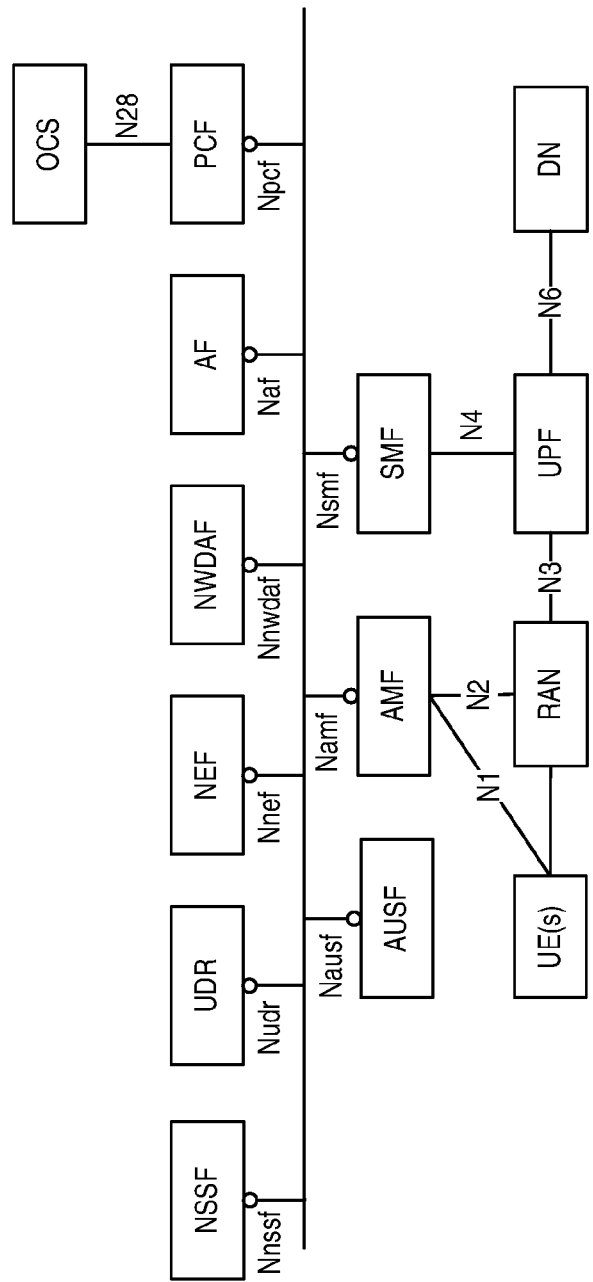
FIG. 1 illustrates a conventional Third Generation Partnership Project (3GPP) Fifth Generation Core Network (5GC) Service-Based Architecture (SBA), which is a network architecture using service-based interfaces between Network Functions (NFs) in the control plane.
Figure 2:
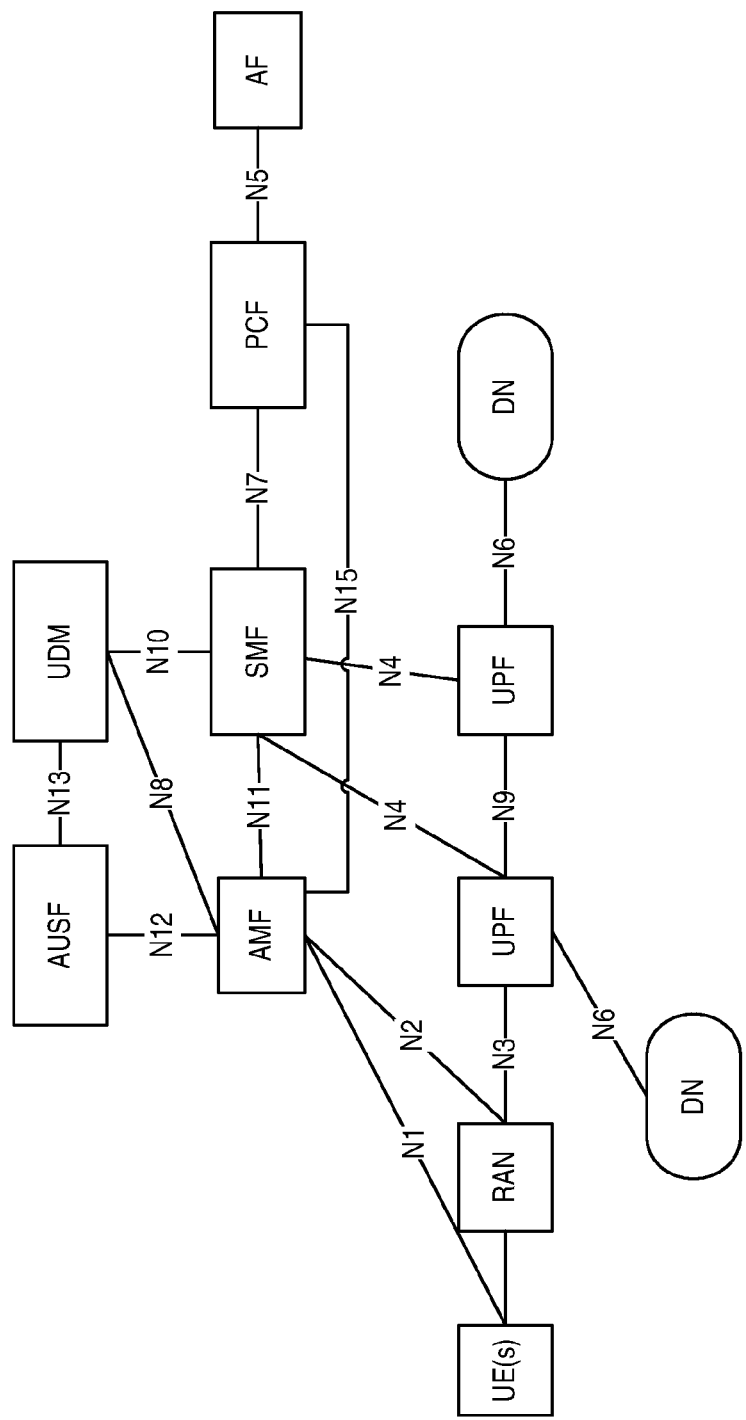
FIG. 2 illustrates a conventional wireless communication system represented as a 5G network architecture composed of core NFs, where interaction between any two NFs is represented by a point-to-point reference point/interface.
Figure 3:
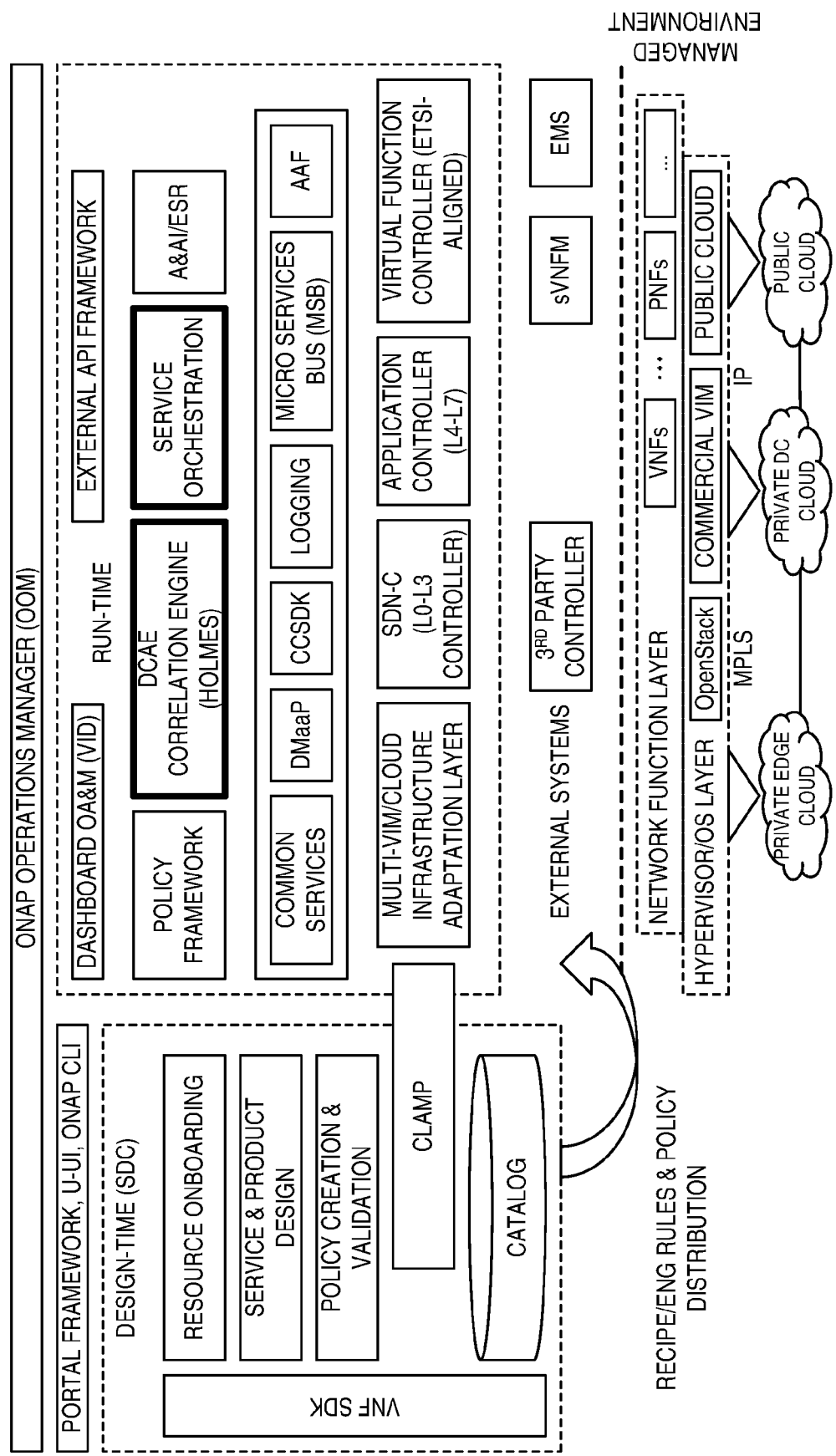
FIG. 3 illustrates a conventional Open Network Automation Platform (ONAP) architecture.

The present disclosure proposes a network automation solution for optimal decisions regarding User Plane Function (UPF) selection, UPF onboarding and Life Cycle Management (LCM), and Application Server (AS) onboarding and LCM. Specifically, methods and systems for Open Network Automation Platform (ONAP)—Fifth Generation Core (5GC) interaction for analytics are herein provided. A Network Data Analytics Function (NWDAF) provides to a Session Management Function (SMF) UPF selection and traffic routing patterns or recommendations, which may be based on the user location, user mobility pattern, application usage pattern, AS locations, AS load, UPF locations, and UPF load. There is combined interaction between an ONAP and an NWDAF or a processing Front-End part in the SMF and the ONAP. This interaction allows the NWDAF or the processing Front-End part in the SMF to get the needed information to produce the recommendations (AS location, AS load) and allows the NWDAF or the processing Front-End part in the SMF to request the ONAP to deploy UPFs and ASs if they are needed for an optimal UPF selection or traffic routing recommendation. The NWDAF or the processing Front-End part in the SMF provides the ONAP with AS onboarding recommendations for a certain application based on the existing AS locations and load, UPF locations and load, user mobility pattern, and application Quality of Service (QoS) requirements. There are, proposed herein, various embodiments which address one or more of the issues disclosed herein. Certain embodiments may provide one or more of the following technical advantage(s). This solution allows operators to leverage analytics to take optimal decisions and actions when it comes to the UPF selection procedure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Figure 4:
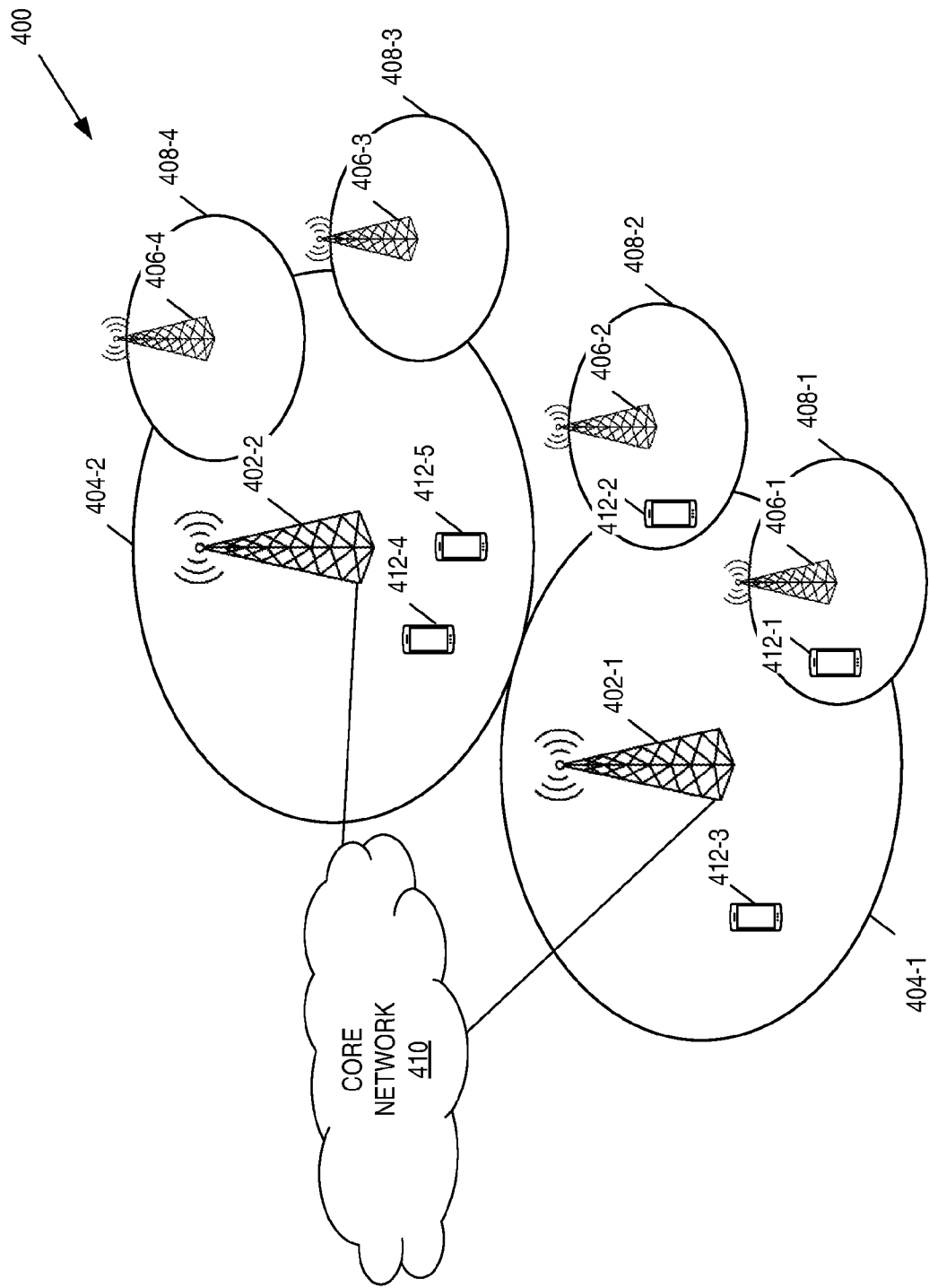
FIG. 4 illustrates one example of a cellular communications network according to some embodiments of the present disclosure.

FIG. 4 illustrates one example of a cellular communications network 400 according to some embodiments of the present disclosure. In the embodiments described herein, the cellular communications network 400 is a 5G NR network. In this example, the cellular communications network 400 includes base stations 402-1 and 402-2, which in LTE are referred to as eNBs and in 5G NR are referred to as gNBs, controlling corresponding macro cells 404-1 and 404-2. The base stations 402-1 and 402-2 are generally referred to herein collectively as base stations 402 and individually as base station 402. Likewise, the macro cells 404-1 and 404-2 are generally referred to herein collectively as macro cells 404 and individually as macro cell 404. The cellular communications network 400 may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The base stations 402 (and optionally the low power nodes 406) are connected to a core network 410.

The base stations 402 and the low power nodes 406 provide service to wireless devices 412-1 through 412-5 in the corresponding cells 404 and 408. The wireless devices 412-1 through 412-5 are generally referred to herein collectively as wireless devices 412 and individually as wireless device 412. The wireless devices 412 are also sometimes referred to herein as User Equipments (UEs).

Front End/Back End

The functionality of analytics can be separated into two parts:

The Back-End collects data from the Network Functions (NFs) and other sources, extracts patterns, and sends them towards the Front End. In the scenarios below, the back-end is part of the NWDAF.

The Front-End process the patterns and provides analytic values and recommendations to the NF Logic. The Front End might be part of the NWDAF or part of another NF. In some embodiments, the Front-End also has access to the NFs' data. For example, if the Front-End is a part of the NF, it has access to the NFs data; if the Front-End is a part of a NWDAF (e.g., collocated with the Back-End), the Front-End can get the data from the NF reports sent to the central NWDAF/Back-End.

Figure 5:
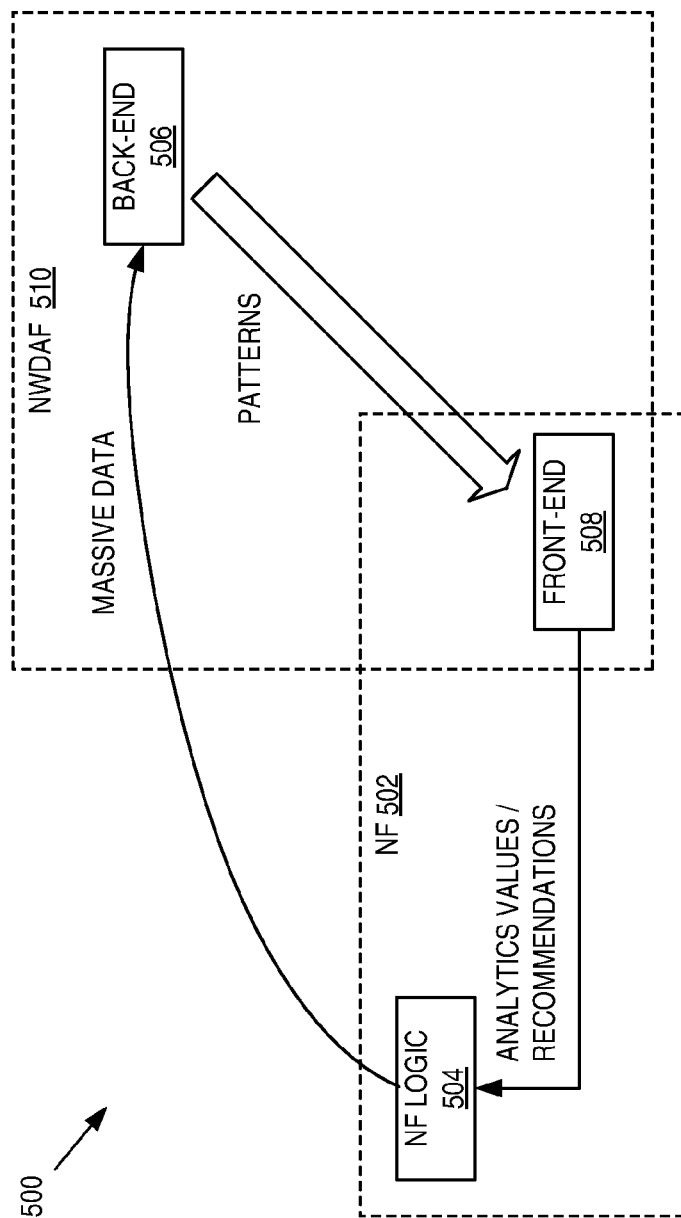
FIG. 5 illustrates information flow between various components of an exemplary system according to some embodiments of the present disclosure.

FIG. 5 illustrates information flow between various components of an exemplary system according to embodiments of the present disclosure. In some embodiments, the following applies:

The back-end collects offline data regarding:
    App start/stop events from the SMF, including the App-Identifier (ID) and user-ID. With this data, the back-end extracts the application usage pattern for the user.
    User mobility events from the Access and Mobility Management Function (AMF), including user-ID, old gNB, and new gNB. With this data the back-end extracts the mobility pattern for the user.
    Applications' QoS requirements. The NWDAF uses this data for the UPF selection recommendation.

The back-end extracts patterns from the collected data and makes them available to the Front End.

If the back-end and the Front End are both part of the NWDAF, it is assumed that the Front End has access to the patterns internally within that entity, and values and recommendations are sent to the NF(s).

If the Front End is part of the NF(s), the NWDAF may send the patterns to the NF (described in the solution below).

The Front End and the ONAP have a common understanding of:
    App-IDs.
    UPF instance IDs.

Either the Front End or the ONAP understands:
    How Data Network Access Identifiers (DNAIs) map to Cloud infrastructures.

The proposed solution is described for the following scenarios:
UPF selection recommendation upon Protocol Data Unit (PDU) session establishment.
Traffic routing recommendation upon PDU session establishment.
AS onboarding recommendation from the ONAP.
Pattern exchange between NWDAF back-end and the Front End—Subscribe/notify.
Pattern exchange between NWDAF back-end and the Front End—Request/response.

UPF Selection Recommendation Upon PDU Session Establishment

Figure 6A:
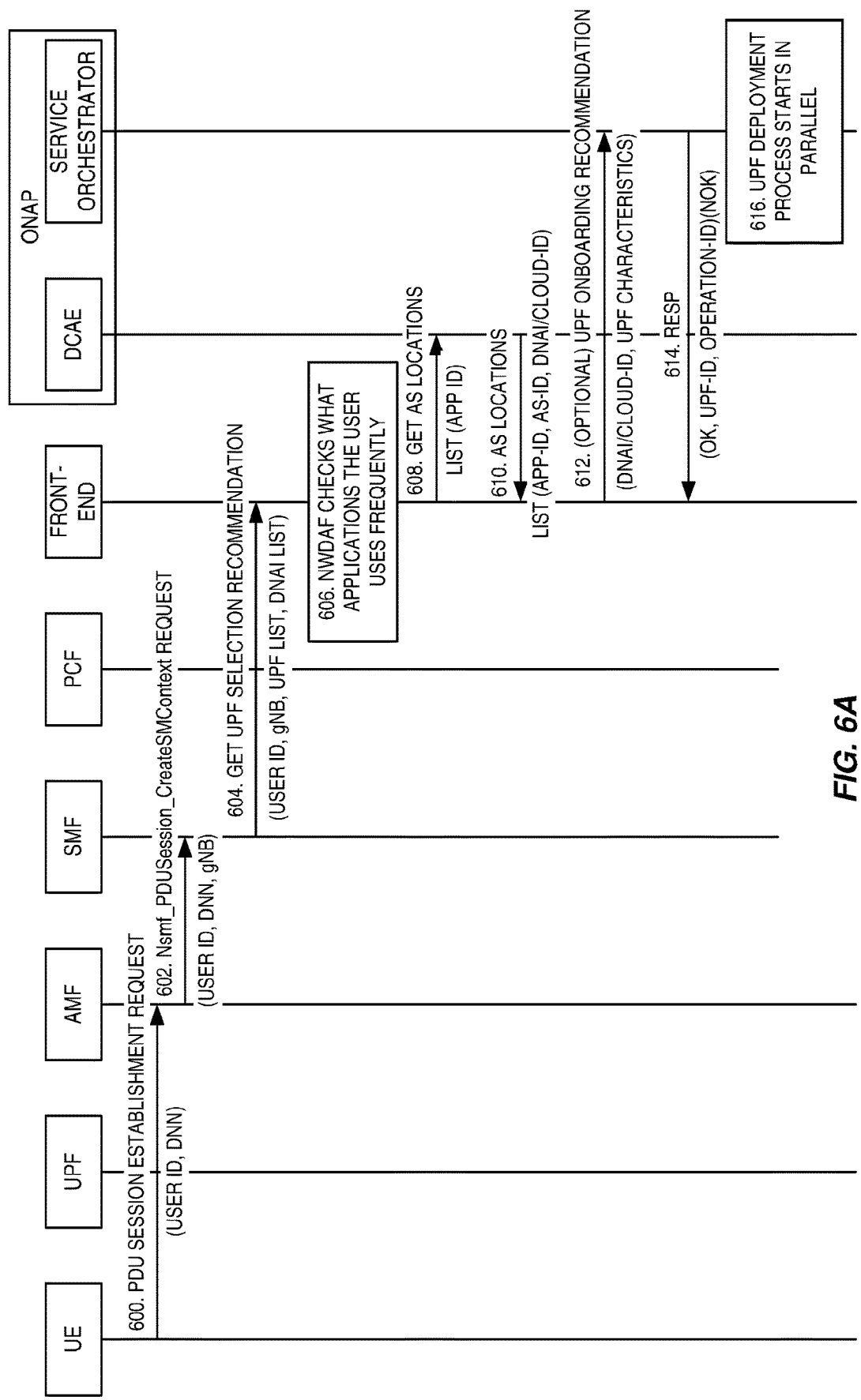
FIGS. 6A, 6B, and 6C illustrate an ONAP-5GC interaction for analytics according to some embodiments of the present disclosure, in which the Session Management Function (SMF) requests a User Plane Function (UPF) selection recommendation when the Protocol Data Unit (PDU) session is established for a certain user.
Figure 6B:
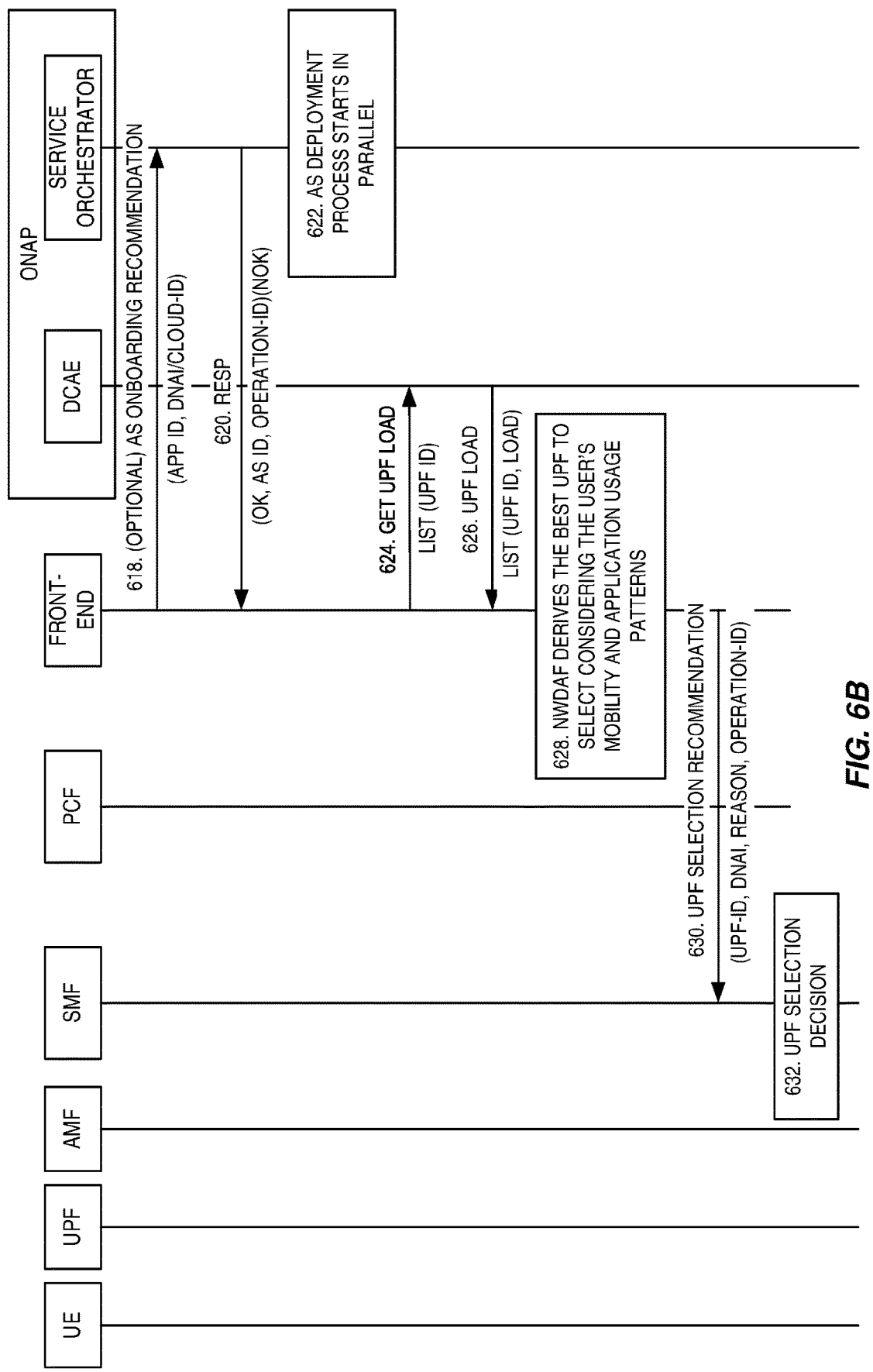
Figure 6C:
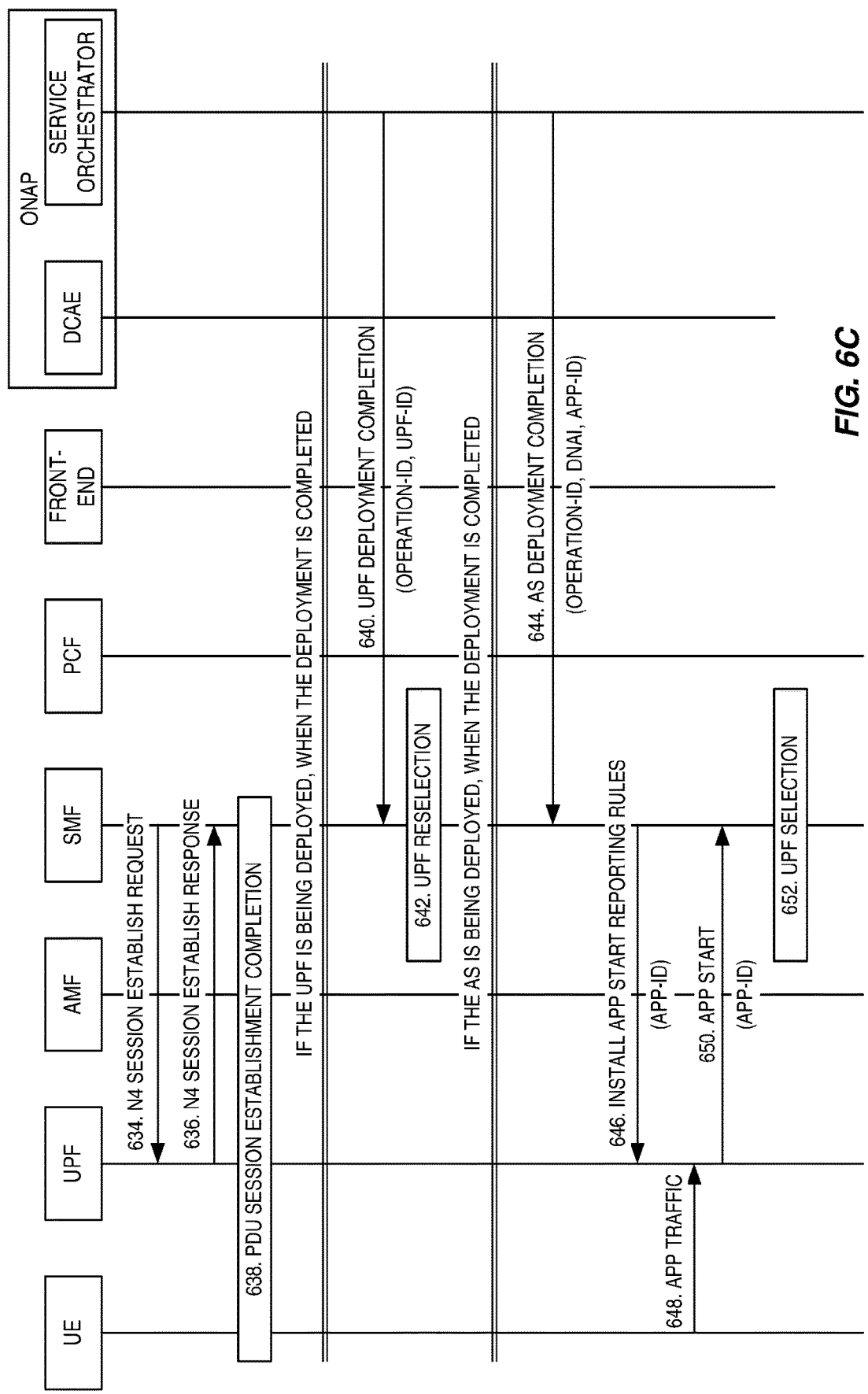

FIGS. 6A, 6B, and 6C illustrate a scenario according to an embodiment of the present disclosure, in which the SMF requests a UPF selection recommendation when the PDU session is established for a certain user. In the embodiment illustrated in FIGS. 6A, 6B, and 6C, the method includes the following steps.

Referring now to FIG. 6A:

Step 600. The UE sends a PDU session establishment request to the AMF including the user ID and Data Network Name (DNN)

Step 602. The AMF sends a Nsmf_PDUSession_CreateSMContext Request to the SMF including the user ID, DNN, and the gNB to which the user is attached to.

Step 604. The SMF logic sends to the Front End a Get UPF selection recommendation message (conventional networks do not do this) including the following parameters:
a. User ID received from the AMF.
b. gNB received from the AMF.
c. (optional) UPF list. The SMF logic may send to the Front End a list of candidate UPFs to select the best one among them. The SMF logic may include in this list, e.g., the UPFs associated to that SMF logic, or the ones belonging to a specific area, etc. If this parameter is not included, the Front End will provide the best UPF based on the Front End's knowledge.
d. (optional) DNAI list. In the same way, the SMF logic may provide a list of DNAIs (based on the candidate UPFs) for the Front End to pick the best one. If this parameter is not included, the Front End will provide the best DNAI based on the Front End knowledge.

Step 606. To select the best UPF for the user, the Front End checks what applications the user uses frequently. How frequent the usage of an application should be for a user, to be considered frequent in this step, is up to the Front End's configuration. It is also up to the Front End to decide for what applications is worth keeping track the usage frequency (e.g., those that are known to be available at edge deployments, or those with tight QoS requirements). The Front End knows this information thanks to the previously computed application usage patterns for the user.

There are two ways in which the patterns are available in the Front End: (1) either the patterns have been previously received by means of the subscribe/notify pattern exchange (FIG. 9); or (2) the patterns are retrieved by means of the request/response pattern exchange (FIG. 10) when this step takes place.

Step 608. To be able to decide the best UPF for the user's applications, the Front End sends a Get AS locations message (conventional networks do not do this) to the Data Collection, Analytics, and Events (DCAE) component of the ONAP to get the locations of the AS of a certain application. The message includes the App-ID as an argument.

Step 610. The DCAE responds to the Front End sending the AS locations for the App-ID (conventional networks do not do this). The message includes a list of the App-ID, AS-ID, and the ID for the AS location, which can be either a DNAI or a Cloud-ID, depending on what parameter the Front End understands.

Step 612. (Optional step) It is assumed that the UPFs are already deployed according to the operator's network planning, but optionally, and in exceptional cases, the Front End could also request the ONAP to deploy a UPF in a Cloud Infrastructure. This may happen if the Front End sees that a UPF located in that Cloud would be the best one to choose. In this case the Front End sends to the ONAP's Service Orchestrator (SO) a UPF onboarding recommendation message (conventional networks do not do this) including the Cloud infrastructure ID (DNAI or Cloud-ID) and (optionally) the UPF characteristics.

Step 614. In turn, the SO may respond with an OK including the UPF-ID and an operation-ID if the UPF is to be deployed. The operation-ID identifies the UPF deployment operation. The SO sends a "not OK" (NOK) if it decides not to deploy the UPF (conventional networks do not do this).

Step 616. The previous step is sent when the UPF deployment decision is taken. The UPF deployment process is carried out in parallel.

Referring now to FIG. 6B:

Step 618. (Optional step) When a certain cloud infrastructure is within the operator's domain, the Front End could also recommend the deployment of an AS (of a certain App) in that infrastructure. This may happen if the Front End sees that there is a UPF that gives connectivity to an Edge Cloud, but there is no AS for the user application(s) in that Cloud. In this case the Front End sends an AS onboarding recommendation message to the SO (conventional networks do not do this) including the App-ID and the ID of the cloud infrastructure (DNAI or Cloud-ID)

Step 620. In turn, the SO may respond with an OK including the AS-ID and an operation-ID if the AS is to be deployed. The operation-ID identifies the AS deployment operation. The SO sends a NOK if it decides not to deploy the AS (conventional networks do not do this).

Step 622. The previous step is sent when the AS deployment decision is taken. The AS deployment process is carried out in parallel.

Step 624. To decide if a UPF is a good choice, the Front End may also send a Get UPF load message to the ONAPs DCAE (conventional networks do not do this) including the list of UPF-IDs.

Step 626. The DCAE responds with a message including the list of UPF-IDs and load values.

Step 628. Then the Front End decides what UPF to recommend for the UPF selection process considering the information and actions from the previous steps (from the SMF and from the ONAP) and the user's application usage and mobility patterns (conventional networks do not do this).

Step 630. The Front End sends the UPF selection recommendation to the SMF (conventional networks do not do this) including:
a. the recommended UPF.
b. recommended DNAI.
c. (optional) reason of the recommendation, which can be for example an indication that it's the closest UPF/DNAI according to the user's mobility pattern, or the least loaded UPF, etc.

d. (optional) operation-ID, indicating that the recommended UPF/DNAI is not available yet because the UPF or AS it's being deployed as a consequence of the previous steps. This parameter is used by SMF logic to correlate the recommendation with the UPF/AS deployment notification that the SO sends later.

Step 632. SMF logic decides the UPF based on the recommendation received in the previous message and its internal policies.

Referring now to FIG. 6C:

Step 634. The SMF sends a message to the selected UPF to establish the session.

Step 636. The UPF acknowledges the session establishment.

Step 638. Remaining steps until PDU session establishment completion.

Step 640. If there are UPFs being deployed as a consequence of the previous steps, the SO notifies the SMF when the deployment is completed (conventional networks do not do this). The message includes:

Operation-ID and UPF-ID if it's a UPF deployment completion.

Step 642. Based on the information received in the previous step, the SMF reselects the UPF accordingly.

Step 644. If there are ASs being deployed as a consequence of the previous steps, the SO notifies the SMF when the deployment is completed (conventional networks do not do this). The message includes:

a. Operation-ID, DNAI, and App-ID if it's an AS deployment completion.

Step 646. The SMF installs the App start reporting rules in the UPF.

Step 648. The UE starts the app and sends traffic.

Step 650. The UPF detects the app and sends the App start report to the SMF indicating the App-ID.

Step 652. The SMF logic reselects the UPF to accommodate the app traffic accordingly.

Note: In this solution the SMF is the entity interacting with NWDAF, but the PCF could be also part of an embodiment.

Traffic Routing Recommendation Upon PDU Session Establishment

Figure 7A:
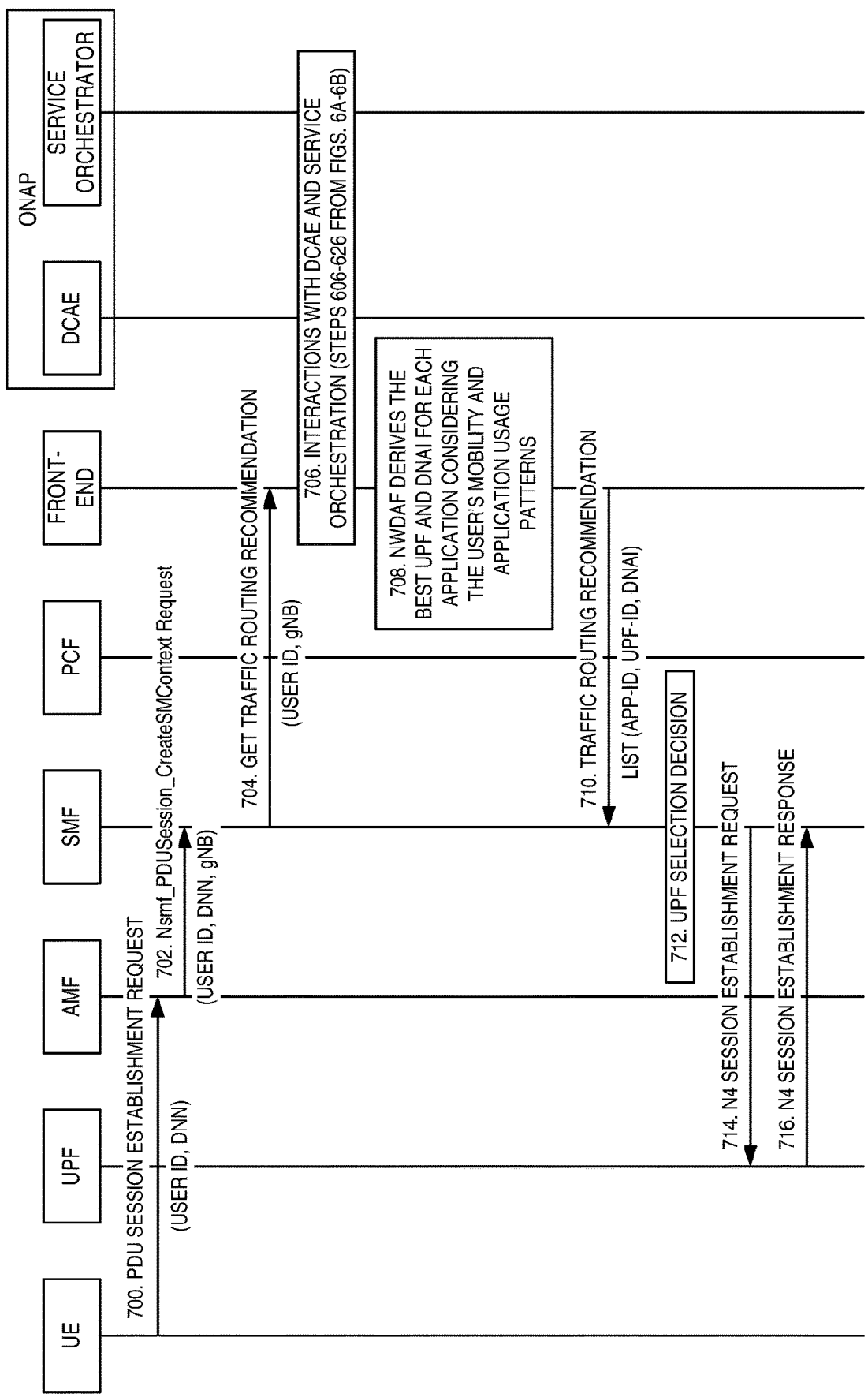
FIGS. 7A and 7B illustrate an ONAP-5GC interaction for analytics according to some embodiments of the present disclosure, in which the SMF requests from the Front End a Traffic Routing recommendation.
Figure 7B:
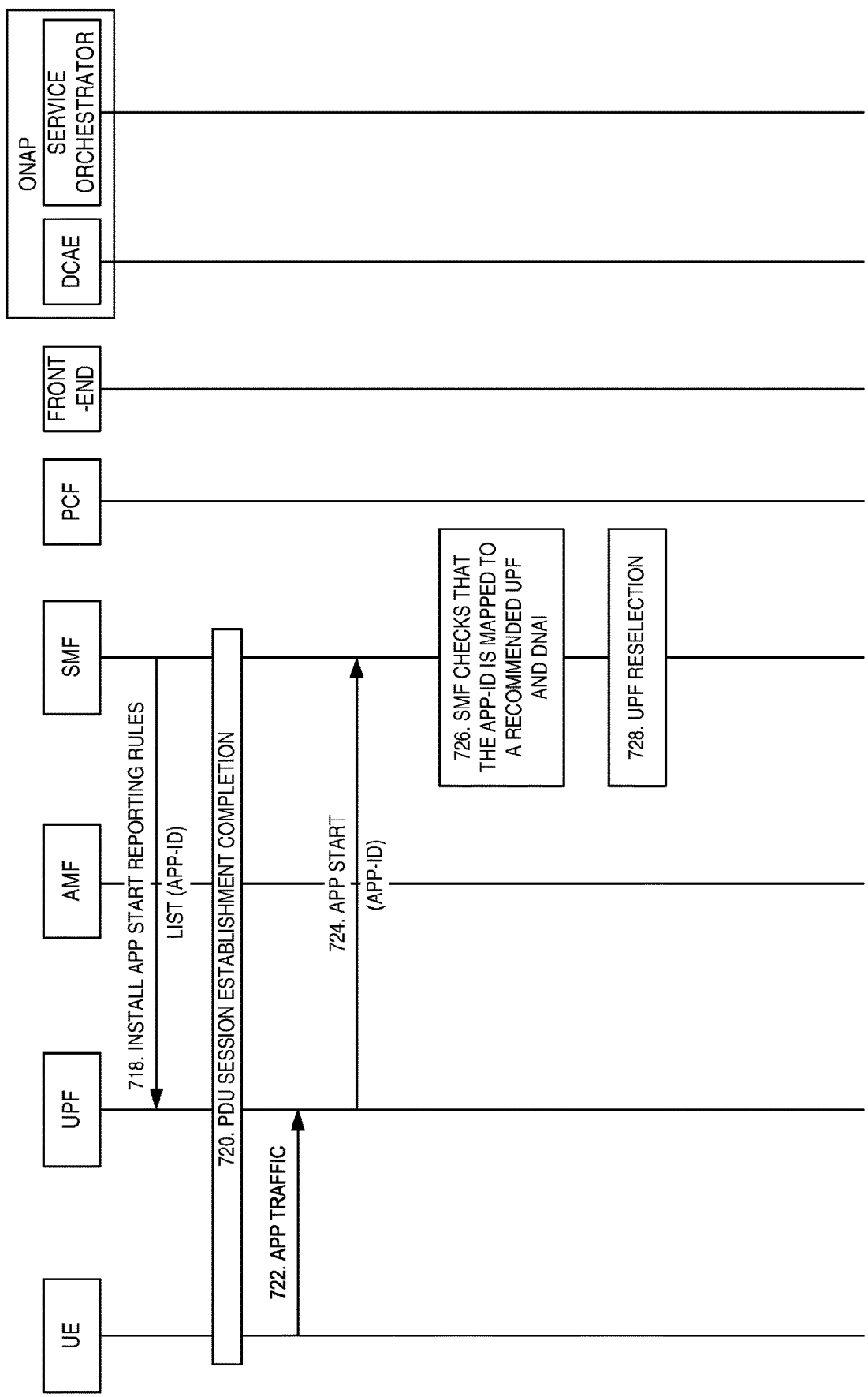

FIGS. 7A and 7B illustrate an alternative to the UPF selection recommendation solution according to other embodiments of the present disclosure. The alternative illustrated in FIGS. 7A and 7B is for the SMF to request a Traffic Routing recommendation to the Front End. Step-wise this solution is equivalent to the previous one but with the following changes:

With reference to FIG. 7A:

Step 700. The UE sends a PDU session establishment request to the AMF including the user ID and DNN.

Step 702. The AMF sends a Nsmf_PDUSession_CreateSMContext Request to the SMF including the user ID, DNN, and the gNB to which the user is attached to.

Step 704. The SMF sends to the Front End a Get Traffic Routing recommendation message (conventional networks do not do this) including the following parameters:

a. User ID received from the AMF.

b. gNB received from the AMF.

Step 706. Interactions with the ONAPs DCAE and SO may take place (steps 606-626 in FIGS. 6A and 6B).

Step 708. The Front End derives the best UPF and DNAI for each application considering the information received in the previous messages and the user's mobility and application usage patterns. There are two ways in which the patterns are available in the Front End: (1) either the patterns have been previously received by means of the subscribe/notify pattern exchange (FIG. 9); or (2) the patterns are retrieved by means of the request/response pattern exchange (FIG. 10) when this step takes place.

Step 710. The Front End sends the Traffic Routing recommendation to the SMF (conventional networks do not do this) including a list mapping each App-ID to the recommended UPF and DNAI (each item in the list refers to a specific App-ID).

Step 712. The SMF logic takes the UPF selection decision based on the information received in the previous message and its internal policies. The SMF logic may select different UPFs (e.g., a central UPF and a local UPF) to allow traffic routing independently between UPFs and DNAIs for different applications (App-IDs). It is up to the SMF logic what decision to take.

Step 714. The SMF establishes the session with the selected UPFs in the previous steps (e.g., central UPF and local UPF).

Step 716. The selected UPFs acknowledge the session establishment.

Referring now to FIG. 7B:

Step 718. The SMF installs in the selected UPFs (or a subset of them, this is up to the SMF logic to decide) rules for detecting when the applications received in step 710 start. It sends a message to the UPF including the list of App-IDs for which the App start rules shall be installed (conventional networks do not do this).

Step 720. Session establishment procedure is completed for the selected UPFs.

Step 722. The user starts executing an application in the UE and application traffic is sent.

Step 724. The UPF detects the application and sends an application start report towards the SMF including the App-ID. This responsibility can be taken by either the local or central UPF if there are several UPFs in the User Plane path, depending on what UPFs the SMF configured in step 718.

Step 726. The SMF logic checks that the App-ID is mapped to a recommended UPF and DNAI (conventional networks do not do this).

Step 728. The SMF logic takes the decision on whether to reselect the UPF (or insert a local UPF) for that application, considering for the decision the information received in step 710 and its internal policies (conventional networks do not do this).

In the embodiment described above, the SMF is the entity interacting with NWDAF, but the PCF could be also part of an embodiment.

In some embodiments, the Front End is placed in the PCF. At UPF selection the PCF might then influence the SMF for instance via traffic steering at PDU session set-up or by initiating a PDU Session Modification procedure. (For further information regarding traffic steering see 3GPP Technical Specification (TS) 23.503).

AS Onboarding Recommendation to the ONAP
(Diagram 3 Below)

Figure 8:
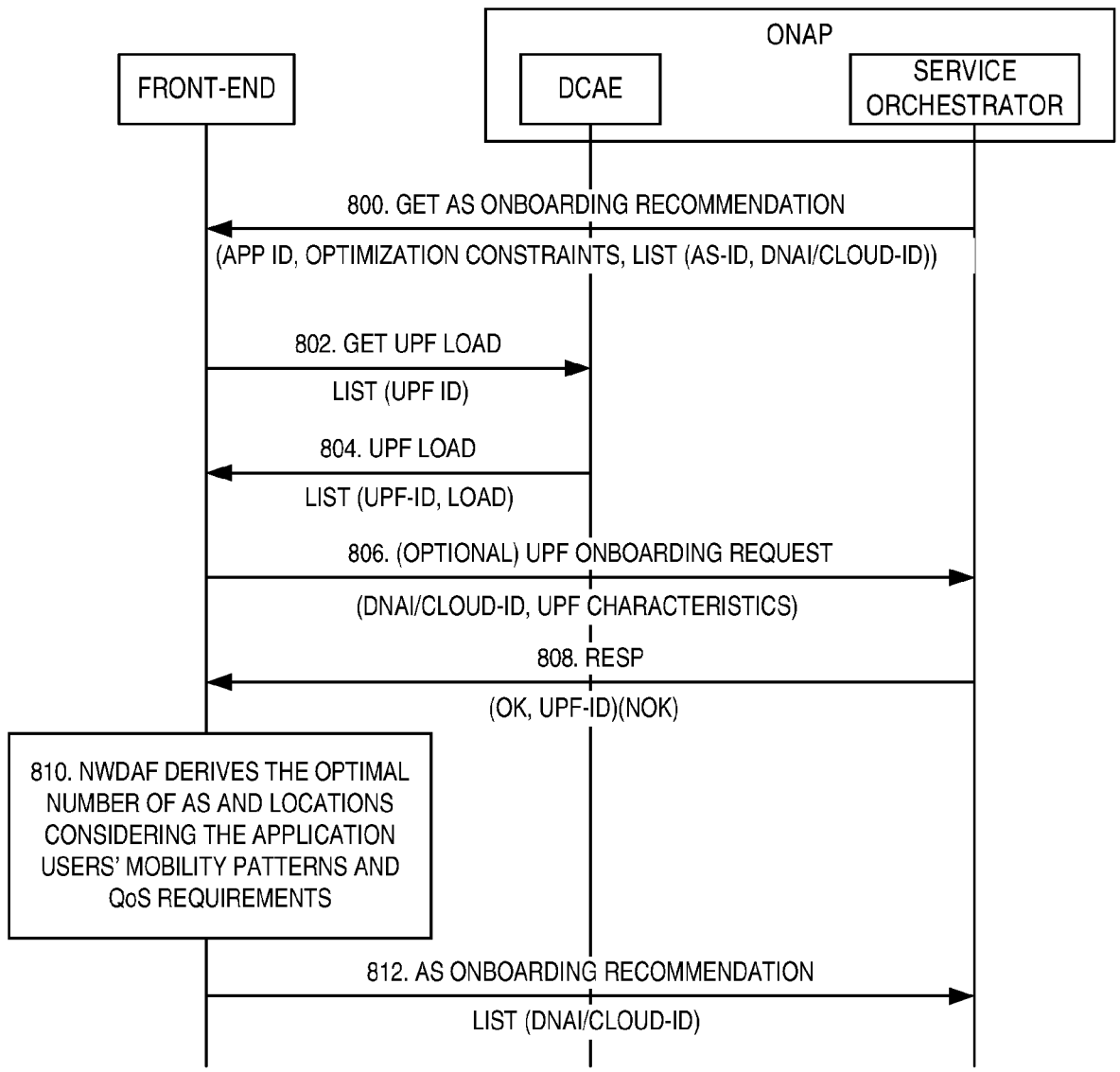
FIG. 8 illustrates an ONAP-5GC interaction for analytics according to some embodiments of the present disclosure, in which the ONAP requests from the Front End a recommendation regarding the number and location of the Application Server (AS) to deploy for a certain application.

FIG. 8 illustrates a scenario according to an embodiment of the present disclosure, in which the ONAP requests a recommendation to the Front End regarding the number and location of the AS to deploy for a certain application. The solution consists on the following steps:

Note: The trigger for message 1 can be, e.g., when an Application Provider onboards an application for the first time or when there is an application scale-out action either commanded by the Application Provider or decided by the ONAP's internal policies.

Step 800. The ONAP's SO sends a Get AS onboarding recommendation message to the Front End including the App-ID and (optionally) a set of optimization constraints (conventional networks do not do this).
  a. The optimization constraints can be, e.g., one of:
    i. Maximum number of servers to be deployed.
    ii. Maximum number of users per server.
    iii. Average traffic load per server, etc.
  b. (optional) If there are already deployed ASs for the application, the AS-IDs and AS locations are included in the message. The ID for the AS location can be either a DNAI or a Cloud-ID, depending on what parameter the Front End understands.

Step 802. To evaluate the optimal AS distribution the Front End needs to know what the status of the UPFs in the network is, so the Front End may also send a Get UPF load message to the ONAPs DCAE (conventional networks do not do this) including the list of UPF-IDs.

Step 804. The DCAE responds with a message including the list of UPF-IDs and load values.

Step 806. (Optional step) It is assumed that the UPFs are already deployed according to the operator's network planning, but optionally, and in exceptional cases, the Front End could also request the ONAP to deploy a UPF in a Cloud Infrastructure. This may happen if the Front End sees that an AS can be deployed in a certain Edge Cloud but there is no UPF that make that Edge Cloud reachable. In this case the Front End sends to the ONAP's SO a UPF onboarding recommendation message (conventional networks do not do this) including the Cloud infrastructure ID (DNAI or Cloud-ID) and (optionally) the UPF characteristics.

Step 808. In turn, the SO may respond with an OK including the UPF-ID if the UPF is to be deployed. The SO sends a NOK if it decides not to deploy the UPF (conventional networks do not do this).

Step 810. The Front End derives the optimal number of AS and locations considering the information in the previous messages, the application usage pattern for the user, the user mobility pattern, and application QoS requirements.

Step 812. The Front End sends the AS onboarding recommendation message to the ONAP's SO including the list of the locations for the ASs, meaning that one AS is to be deployed for each of the locations in the list (conventional networks do not do this). The ID for the AS location can be either a DNAI or a Cloud-ID, depending on what parameter the Front End understands.

Pattern Exchange Between NWDAF Back-End and Front End—Subscribe/Notify

Figure 9:
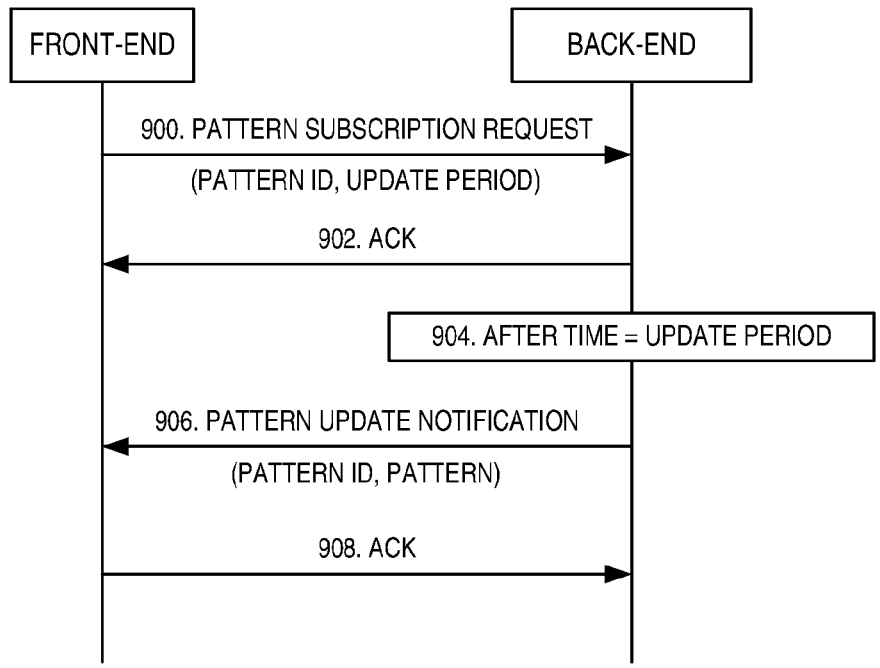
FIG. 9 illustrates an ONAP-5GC interaction for analytics according to some embodiments of the present disclosure, in which patterns are exchanged between the NWDAF back-end and the Front End according to a subscribe/notify arrangement.

FIG. 9 illustrates a scenario according to an embodiment of the present disclosure, in which patterns are exchanged between the NWDAF back-end and the Front End according to a subscribe/notify arrangement. This process may be executed in parallel and triggered independently of the above procedures. This embodiment is suitable where the Front End is deployed in an NF.

Step 900. The Front End sends a Pattern subscription request to NWDAF back-end indicating the Pattern ID and the period for the back-end to send the pattern updates (conventional networks do not do this).

Step 902. The back-end sends an acknowledgement (ACK).

Step 904. A time equal to the indicated update period elapses.

Step 906. The NWDAF back-end sends the Pattern update notification to the Front End including the Pattern ID and the pattern update (conventional networks do not do this). In some embodiments, the pattern update format can be one of:
  i. Sequence of analytic values tagged with the time in the future when they apply (e.g., sequence of gNBs and time when the user is predicted to be attached);
  ii. Mathematical description of the analytics values evolution over time (e.g., probability distribution of the UPF load over time).

Step 908. The Front End sends an ACK.

In some embodiments, this process may apply also to specific analytic values, instead of patterns.

Pattern Exchange Between NWDAF Back-End and Front End—Request/Response

Figure 10:
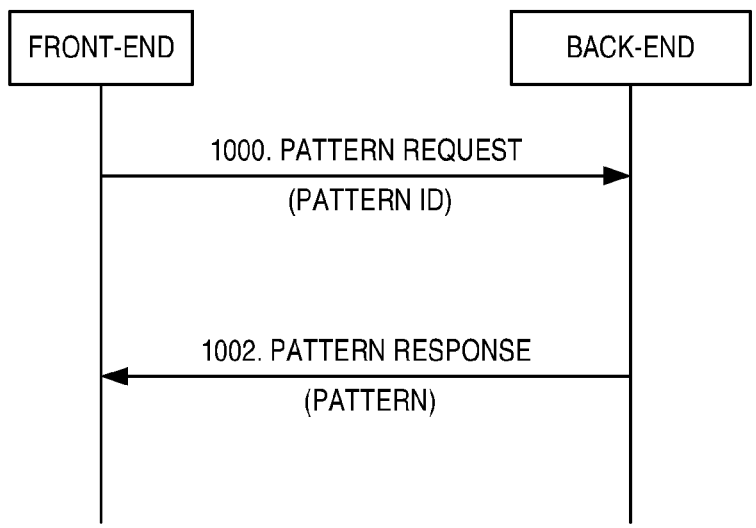
FIG. 10 illustrates an ONAP-5GC interaction for analytics according to some embodiments of the present disclosure, in which patterns are exchanged between the NWDAF back-end and the Front End according to a request/response arrangement.

FIG. 10 illustrates a scenario according to an embodiment of the present disclosure, in which patterns are exchanged between the NWDAF back-end and the Front End according to a request/response arrangement. The trigger for a request may be in each decision box in the previous diagrams.

Step 1000. The Front End sends a Pattern request to NWDAF back-end indicating the Pattern ID (conventional networks do not do this).

Step 1002. The NWDAF back-end sends the Pattern to the Front End including the pattern as described in step 906 above (conventional networks do not do this).

In some embodiments, this process may apply also to specific analytic values, instead of patterns.

Other Embodiments

Figure 11:
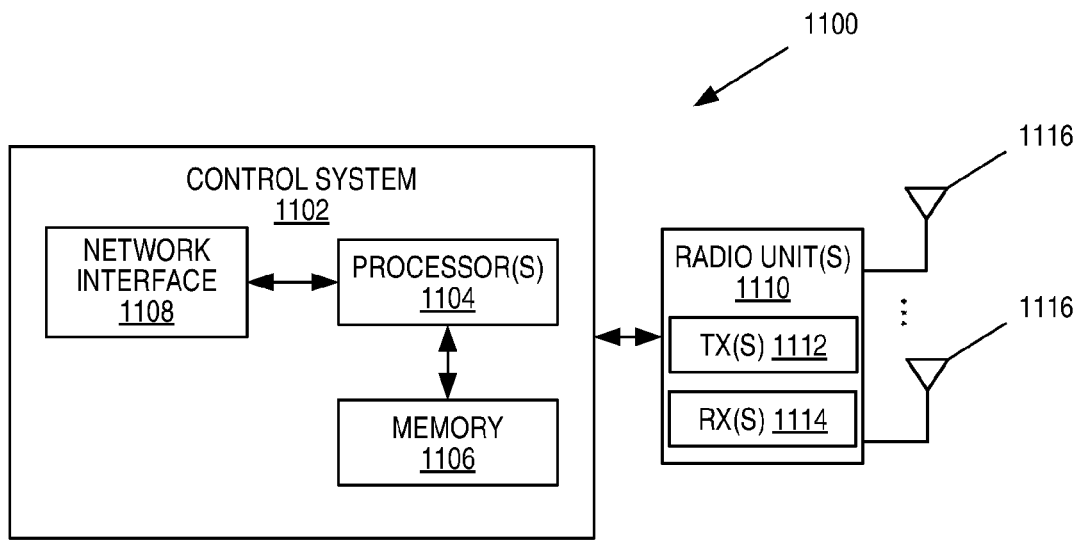
FIG. 11 is a schematic block diagram of a radio access node according to some embodiments of the present disclosure.

FIG. 11 is a schematic block diagram of a radio access node 1100 according to some embodiments of the present disclosure. The radio access node 1100 may be, for example, a base station 402 or 406. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 includes one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
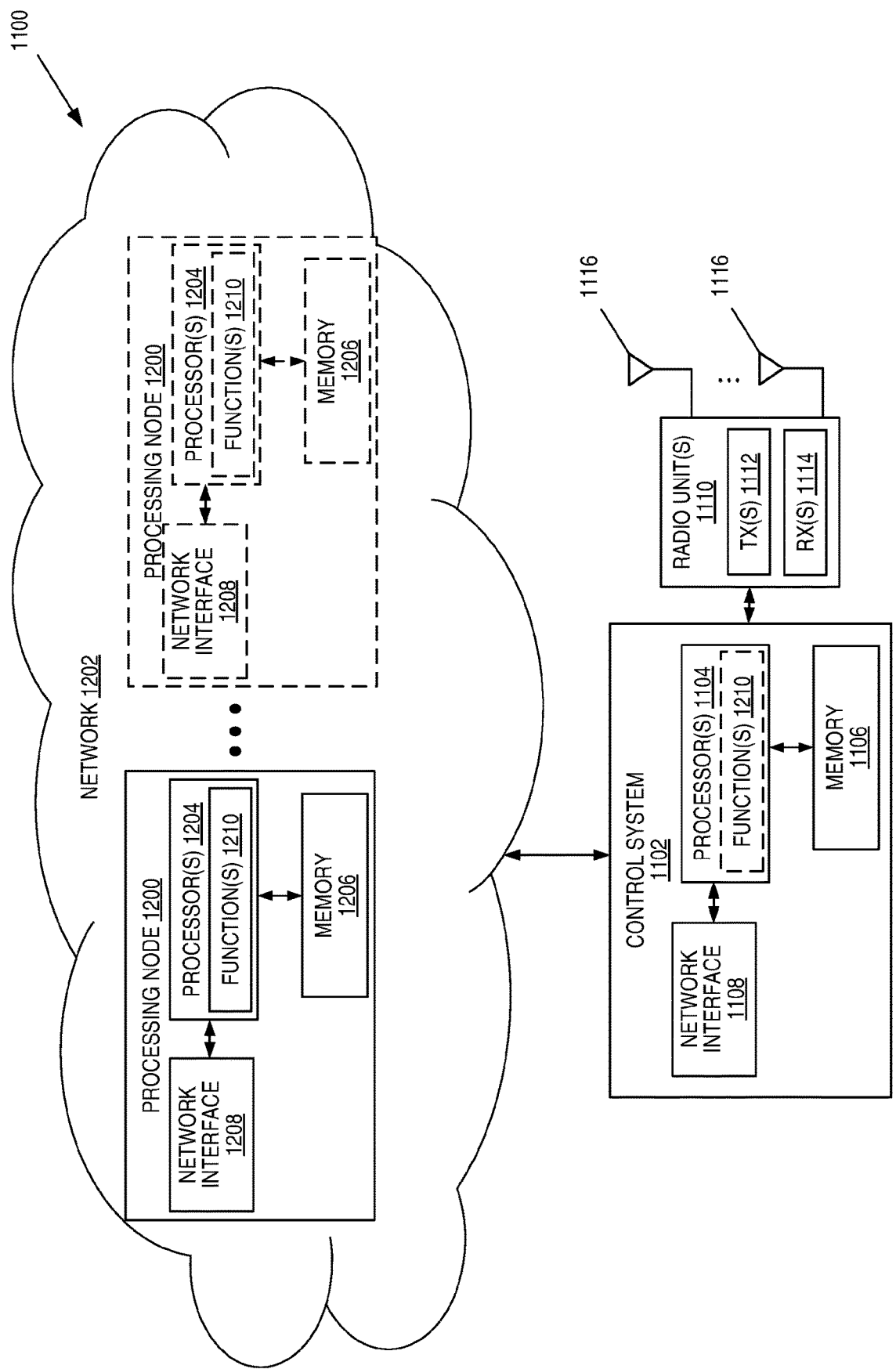
FIG. 12 is a schematic block diagram that illustrates a virtualized embodiment of the radio access node according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 includes the control system 1102 that includes the one or more processors 1104 (e.g., CPUs, ASICs, FPGAs, and/or the like), the memory 1106, and the network interface 1108 and the one or more radio units 1110 that each includes the one or more transmitters 1112 and the one or more receivers 1114 coupled to the one or more antennas 1116, as described above. The control system 1102 is connected to the radio unit(s) 1110 via, for example, an optical cable or the like. The control system 1102 is connected to one or more processing nodes 1200 coupled to or included as part of a network(s) 1202 via the network interface 1108. Each processing node 1200 includes one or more processors 1204 (e.g., CPUs, ASICs, FPGAs, and/or the like), memory 1206, and a network interface 1208.

In this example, functions 1210 of the radio access node 1100 described herein are implemented at the one or more processing nodes 1200 or distributed across the control system 1102 and the one or more processing nodes 1200 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicates directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
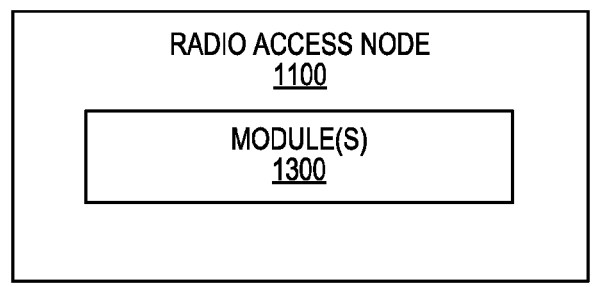
FIG. 13 is a schematic block diagram of the radio access node according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
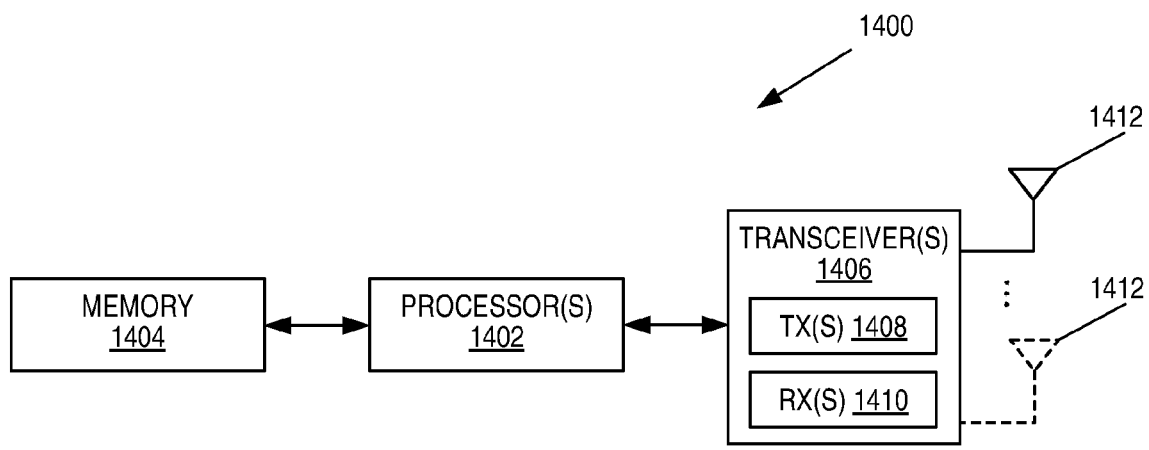
FIG. 14 is a schematic block diagram of a User Equipment (UE) according to some embodiments of the present disclosure.

FIG. 14 is a schematic block diagram of a UE 1400 according to some embodiments of the present disclosure. As illustrated, the UE 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the UE 1400 described above may be fully or partially implemented in software that is, e.g., stored in the memory 1404 and executed by the processor(s) 1402. Note that the UE 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the UE 1400 and/or allowing output of information from the UE 1400), a power supply (e.g., a battery and associated power circuitry), etc.

In some embodiments, a computer program including instructions which, when executed by at least one processor, causes the at least one processor to carry out the functionality of the UE 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
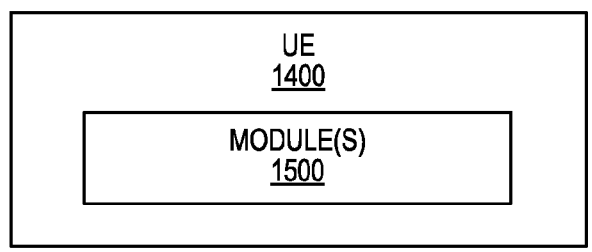
FIG. 15 is a schematic block diagram of the UE according to some other embodiments of the present disclosure.

FIG. 15 is a schematic block diagram of the UE 1400 according to some other embodiments of the present disclosure. The UE 1400 includes one or more modules 1500, each of which is implemented in software. The module(s) 1500 provide the functionality of the UE 1400 described herein.

Figure 16:
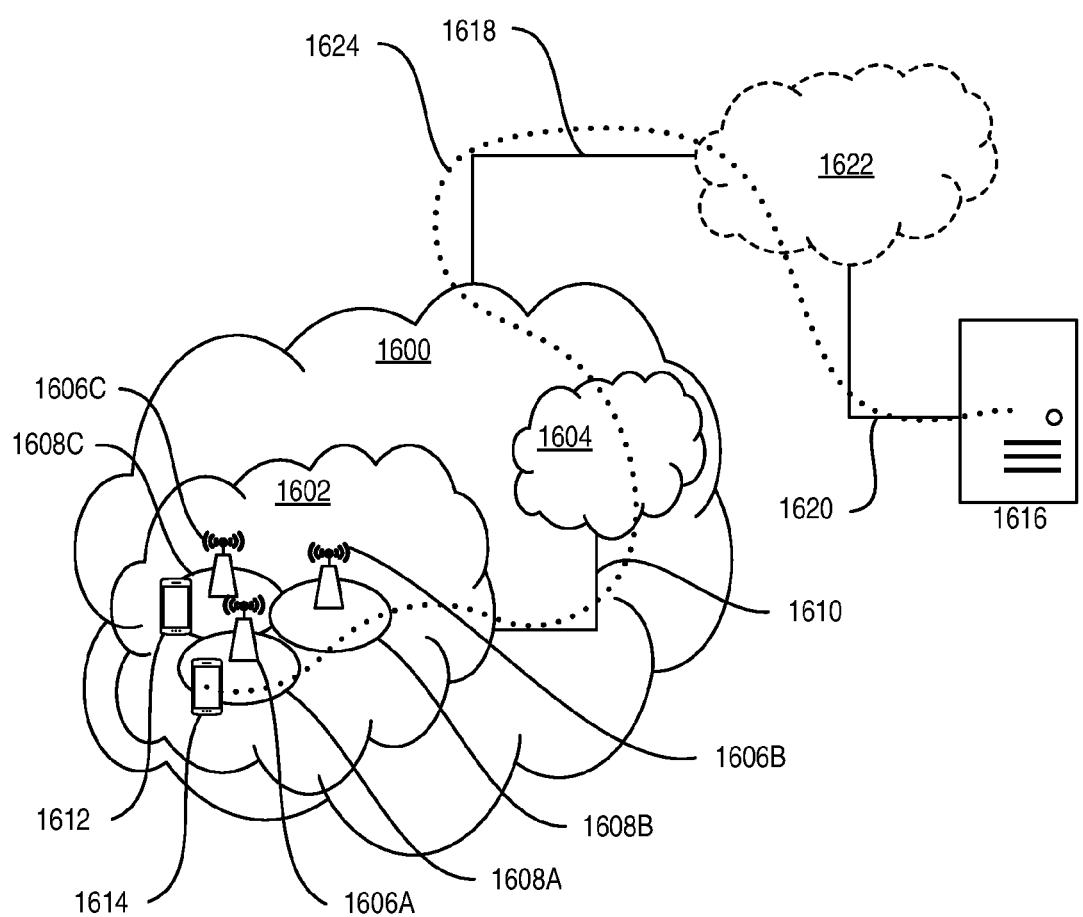
FIG. 16 illustrates a communication system according to some embodiments of the present disclosure.

FIG. 16 illustrates a communication system according to some embodiments of the present disclosure. With reference to FIG. 16, in accordance with an embodiment, a communication system includes a telecommunication network 1600, such as a 3GPP-type cellular network, which comprises an access network 1602, such as a RAN, and a core network 1604. The access network 1602 comprises a plurality of base stations 1606A, 1606B, 1606C, such as Node Bs, eNBs, gNBs, or other types of wireless Access Points (APs), each defining a corresponding coverage area 1608A, 1608B, 1608C. Each base station 1606A, 16068, 1606C is connectable to the core network 1604 over a wired or wireless connection 1610. A first UE 1612 located in coverage area 1608C is configured to wirelessly connect to, or be paged by, the corresponding base station 1606C. A second UE 1614 in coverage area 1608A is wirelessly connectable to the corresponding base station 1606A. While a plurality of UEs 1612, 1614 are illustrated in this example, the disclosed embodiments are equally applicable to a situation where a sole UE is in the coverage area or where a sole UE is connecting to the corresponding base station 1606.

The telecommunication network 1600 is itself connected to a host computer 1616, which may be embodied in the hardware and/or software of a standalone server, a cloud-implemented server, a distributed server, or as processing resources in a server farm. The host computer 1616 may be under the ownership or control of a service provider, or may be operated by the service provider or on behalf of the service provider. Connections 1618 and 1620 between the telecommunication network 1600 and the host computer 1616 may extend directly from the core network 1604 to the host computer 1616 or may go via an optional intermediate network 1622. The intermediate network 1622 may be one of, or a combination of more than one of, a public, private, or hosted network; the intermediate network 1622, if any, may be a backbone network or the Internet; in particular, the intermediate network 1622 may comprise two or more sub-networks (not shown).

The communication system of FIG. 16 as a whole enables connectivity between the connected UEs 1612, 1614 and the host computer 1616. The connectivity may be described as an Over-the-Top (OTT) connection 1624. The host computer 1616 and the connected UEs 1612, 1614 are configured to communicate data and/or signaling via the OTT connection 1624, using the access network 1602, the core network 1604, any intermediate network 1622, and possible further infrastructure (not shown) as intermediaries. The OTT connection 1624 may be transparent in the sense that the participating communication devices through which the OTT connection 1624 passes are unaware of routing of uplink and downlink communications. For example, the base station 1606 may not or need not be informed about the past routing of an incoming downlink communication with data originating from the host computer 1616 to be forwarded (e.g., handed over) to a connected UE 1612. Similarly, the base station 1606 need not be aware of the future routing of an outgoing uplink communication originating from the UE 1612 towards the host computer 1616.

Figure 17:
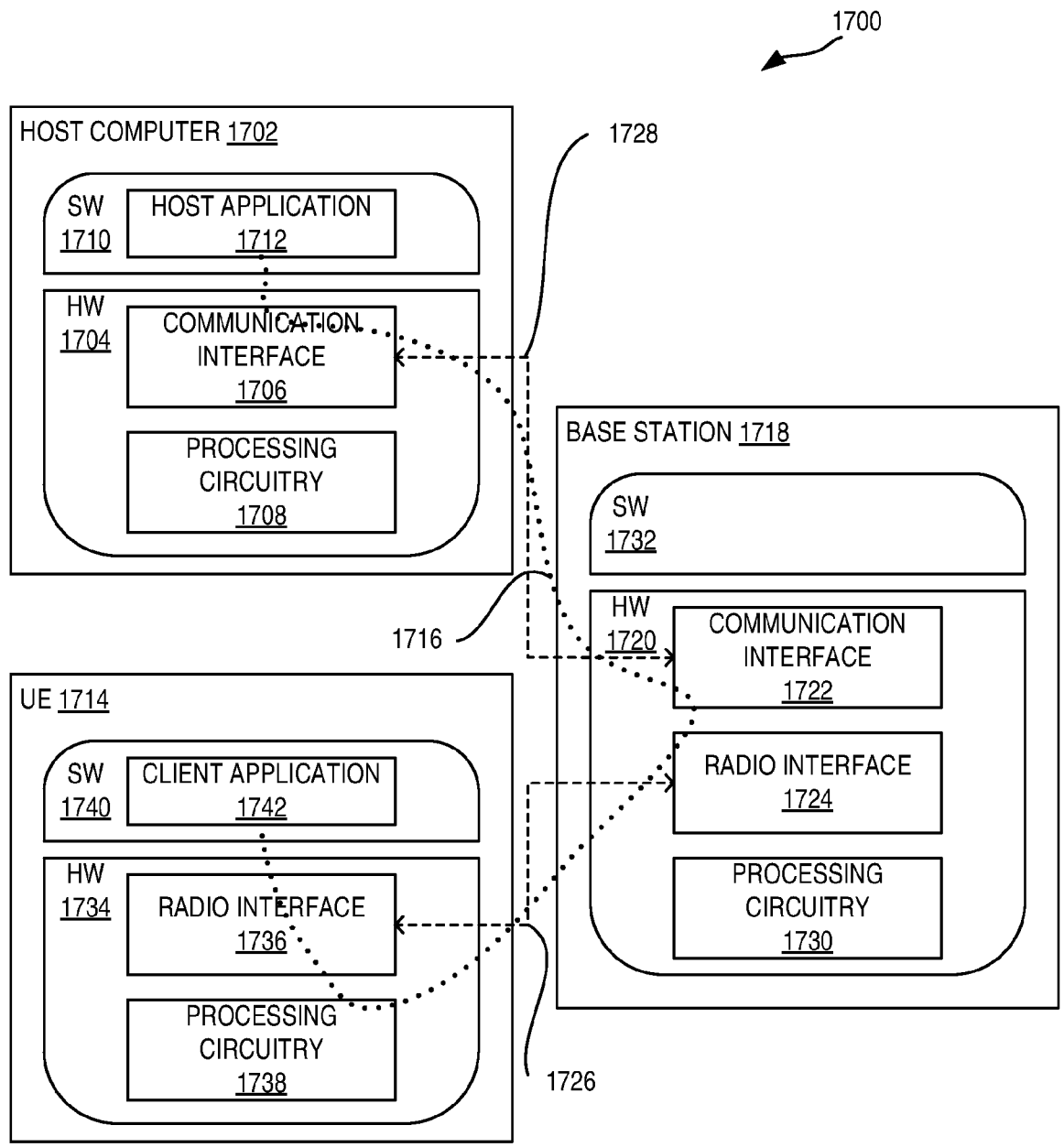
FIG. 17 illustrates a communication system in accordance with other embodiments of the present disclosure.

FIG. 17 illustrates a communication system in accordance with other embodiments of the present disclosure. Example implementations of the UE, base station, and host computer discussed in the preceding paragraphs will now be described with reference to FIG. 17. In a communication system 1700, a host computer 1702 comprises hardware 1704 including a communication interface 1706 configured to set up and maintain a wired or wireless connection with an interface of a different communication device of the communication system 1700. The host computer 1702 further comprises processing circuitry 1708, which may have storage and/or processing capabilities. In particular, the processing circuitry 1708 may comprise one or more programmable processors, ASICs, FPGAs, or combinations of these (not shown) adapted to execute instructions. The host computer 1702 further comprises software 1710, which is stored in or accessible by the host computer 1702 and executable by the processing circuitry 1708. The software 1710 includes a host application 1712. The host application 1712 may be operable to provide a service to a remote user, such as a UE 1714 connecting via an OTT connection 1716 terminating at the UE 1714 and the host computer 1702. In providing the service to the remote user, the host application 1712 may provide user data which is transmitted using the OTT connection 1716.

The communication system 1700 further includes a base station 1718 provided in a telecommunication system and comprising hardware 1720 enabling it to communicate with the host computer 1702 and with the UE 1714. The hardware 1720 may include a communication interface 1722 for setting up and maintaining a wired or wireless connection with an interface of a different communication device of the communication system 1700, as well as a radio interface 1724 for setting up and maintaining at least a wireless connection 1726 with the UE 1714 located in a coverage area (not shown in FIG. 17) served by the base station 1718. The communication interface 1722 may be configured to facilitate a connection 1728 to the host computer 1702. The connection 1728 may be direct or it may pass through a core network (not shown in FIG. 17) of the telecommunication system and/or through one or more intermediate networks outside the telecommunication system. In the embodiment shown, the hardware 1720 of the base station 1718 further includes processing circuitry 1730, which may comprise one or more programmable processors, ASICs, FPGAs, or combinations of these (not shown) adapted to execute instructions. The base station 1718 further has software 1732 stored internally or accessible via an external connection.

The communication system 1700 further includes the UE 1714 already referred to. The UE's 1714 hardware 1734 may include a radio interface 1736 configured to set up and maintain a wireless connection 1726 with a base station serving a coverage area in which the UE 1714 is currently located. The hardware 1734 of the UE 1714 further includes processing circuitry 1738, which may comprise one or more programmable processors, ASICs, FPGAs, or combinations of these (not shown) adapted to execute instructions. The UE 1714 further comprises software 1740, which is stored in or accessible by the UE 1714 and executable by the processing circuitry 1738. The software 1740 includes a client application 1742. The client application 1742 may be operable to provide a service to a human or non-human user via the UE 1714, with the support of the host computer 1702. In the host computer 1702, the executing host application 1712 may communicate with the executing client application 1742 via the OTT connection 1716 terminating at the UE 1714 and the host computer 1702. In providing the service to the user, the client application 1742 may receive request data from the host application 1712 and provide user data in response to the request data. The OTT connection 1716 may transfer both the request data and the user data. The client application 1742 may interact with the user to generate the user data that it provides.

It is noted that the host computer 1702, the base station 1718, and the UE 1714 illustrated in FIG. 17 may be similar or identical to the host computer 1616, one of the base stations 1606A, 1606B, 1606C, and one of the UEs 1612, 1614 of FIG. 16, respectively. This is to say, the inner workings of these entities may be as shown in FIG. 17 and independently, the surrounding network topology may be that of FIG. 16.

In FIG. 17, the OTT connection 1716 has been drawn abstractly to illustrate the communication between the host computer 1702 and the UE 1714 via the base station 1718 without explicit reference to any intermediary devices and the precise routing of messages via these devices. The network infrastructure may determine the routing, which may be configured to hide from the UE 1714 or from the service provider operating the host computer 1702, or both. While the OTT connection 1716 is active, the network infrastructure may further take decisions by which it dynamically changes the routing (e.g., on the basis of load balancing consideration or reconfiguration of the network).

The wireless connection 1726 between the UE 1714 and the base station 1718 is in accordance with the teachings of the embodiments described throughout this disclosure. One or more of the various embodiments improve the performance of OTT services provided to the UE 1714 using the OTT connection 1716, in which the wireless connection 1726 forms the last segment. More precisely, the teachings of these embodiments may improve the interaction between the ONAP and NWDAF or other functions within the 5GC and thereby provide benefits such as a network automation solution for optimal decisions regarding UPF selection, UPF onboarding and LCM, as well as AS onboarding and LCM.

A measurement procedure may be provided for the purpose of monitoring data rate, latency, and other factors on which the one or more embodiments improve. There may further be an optional network functionality for reconfiguring the OTT connection 1716 between the host computer 1702 and the UE 1714, in response to variations in the measurement results. The measurement procedure and/or the network functionality for reconfiguring the OTT connection 1716 may be implemented in the software 1710 and the hardware 1704 of the host computer 1702 or in the software 1740 and the hardware 1734 of the UE 1714, or both. In some embodiments, sensors (not shown) may be deployed in or in association with communication devices through which the OTT connection 1716 passes; the sensors may participate in the measurement procedure by supplying values of the monitored quantities exemplified above, or supplying values of other physical quantities from which the software 1710, 1740 may compute or estimate the monitored quantities. The reconfiguring of the OTT connection 1716 may include message format, retransmission settings, preferred routing, etc.; the reconfiguring need not affect the base station 1718, and it may be unknown or imperceptible to the base station 1718. Such procedures and functionalities may be known and practiced in the art. In certain embodiments, measurements may involve proprietary UE signaling facilitating the host computer 1702's measurements of throughput, propagation times, latency, and the like. The measurements may be implemented in that the software 1710 and 1740 causes messages to be transmitted, in particular empty or 'dummy' messages, using the OTT connection 1716 while it monitors propagation times, errors, etc.

FIG. 18 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 18 will be included in this section. In step 1800, the host computer provides user data. In sub-step 1802 (which may be optional) of step 1800, the host computer provides the user data by executing a host application. In step 1804, the host computer initiates a transmission carrying the user data to the UE. In step 1806 (which may be optional), the base station transmits to the UE the user data which was carried in the transmission that the host computer initiated, in accordance with the teachings of the embodiments described throughout this disclosure. In step 1808 (which may also be optional), the UE executes a client application associated with the host application executed by the host computer.

FIG. 19 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 19 will be included in this section. In step 1900 of the method, the host computer provides user data. In an optional sub-step (not shown) the host computer provides the user data by executing a host application. In step 1902, the host computer initiates a transmission carrying the user data to the UE. The transmission may pass via the base station, in accordance with the teachings of the embodiments described throughout this disclosure. In step 1904 (which may be optional), the UE receives the user data carried in the transmission.

FIG. 20 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 20 will be included in this section. In step 2000 (which may be optional), the UE receives input data provided by the host computer. Additionally or alternatively, in step 2002, the UE provides user data. In sub-step 2004 (which may be optional) of step 2000, the UE provides the user data by executing a client application. In sub-step 2006 (which may be optional) of step 2002, the UE executes a client application which provides the user data in reaction to the received input data provided by the host computer. In providing the user data, the executed client application may further consider user input received from the user. Regardless of the specific manner in which the user data was provided, the UE initiates, in sub-step 2008 (which may be optional), transmission of the user data to the host computer. In step 2010 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 21 will be included in this section. In step 2100 (which may be optional), in accordance with the teachings of the embodiments described throughout this disclosure, the base station receives user data from the UE. In step 2102 (which may be optional), the base station initiates transmission of the received user data to the host computer. In step 2104 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Embodiment 1

A method, performed by a Front End node for receiving patterns extracted from events and current network status data in a telecommunications network, comprises: receiving, from a SMF, a request for a UPF selection recommendation for a user; determining a list of applications associated with the user; sending, to a DCAE, function of an ONAP, a request for a list of AS locations; receiving, from the DCAE function, the list of AS locations; selecting a UPF based on the user's mobility and application usage patterns; and sending, to the SMF, a recommendation identifying the selected UPF.

Embodiment 2

The method of embodiment 1 wherein the Front End node performing the method comprises a NWDAF or a network function other than a NWDAF.

Embodiment 3

The method of embodiment 1 or 2 wherein the received request for a UPF selection recommendation comprises at least one of: information identifying the user; information identifying a gNB; a list of at least one UPF; and a list of at least one DNAI.

Embodiment 4

The method of any of embodiments 1-3 wherein the sent request for the list of AS locations comprises a list identifying at least one application associated with the user.

Embodiment 5

The method of any of embodiments 1-4 wherein the received list of AS locations comprises at least one of: information identifying an application; information identifying an AS; information identifying an AS location; a DNAI; and a Cloud Identifier ID.

Embodiment 6

The method of any of embodiments 1-5 wherein the method further comprises, after receiving the list of AS locations and before selecting the UPF: sending, to a SO function of the ONAP, a UPF onboarding recommendation for requesting the ONAP to deploy a UPF in a cloud infrastructure; and receiving a response to the UPF onboarding recommendation indicating that the UPF is to be deployed or that the UPF is not to be deployed, wherein an indication that the UPF is to be deployed comprises a UPF-ID that identifies a UPF and an operation ID that identifies a UPF deployment operation.

Embodiment 7

The method of any of embodiments 1-6 wherein the method further comprises, after receiving the list of AS locations and before selecting the UPF: sending, to the SO function of the ONAP, an AS onboarding recommendation for requesting the ONAP to deploy an AS in a cloud infrastructure; and receiving, from the SO function, a response to the AS onboarding recommendation indicating that the AS is to be deployed or that the AS is not to be deployed, wherein an indication that the AS is to be deployed comprises an AS-ID that identifies an AS and an operation ID that identifies the AS deployment operation.

Embodiment 8

The method of any of embodiments 1-7 wherein the method further comprises, after receiving the list of AS locations and before selecting the UPF: sending, to the DCAE function, a request to get load information about one or more UPFs; and receiving, from the DCAE function, load information for the one or more UPFs, wherein the UPF selection is additionally based on the UPF load information.

Embodiment 9

A method performed by a Front End node for receiving patterns extracted from events and current network status data in a telecommunications network, the method comprising: receiving, from a SMF, a request for a traffic routing recommendation for a user; determining a list of applications associated with the user; sending, to a DCAE function of an ONAP, a request for a list of AS, locations; receiving, from the DCAE function, the list of AS locations; selecting, for each application, a UPF and DNAI, based on the user's mobility and application usage patterns; and sending, to the SMF, a traffic routing recommendation comprising a list that maps each application to a recommended UPF and DNAI.

Embodiment 10

The method of embodiment 9 wherein the Front End node performing the method comprises a NWDAF or a NF other than a NWDAF.

Embodiment 11

The method of embodiment 9 or 10 wherein the received request for the traffic routing recommendation for the user comprises at least one of: information identifying the user; and information identifying a gNB.

Embodiment 12

The method of any of embodiments 9-11 wherein the sent request for the list of AS locations comprises a list identifying at least one application associated with the user.

Embodiment 13

The method of any of embodiments 9-12 wherein the received list of AS locations comprises at least one of: information identifying an application; information identifying an AS; information identifying an AS location; a DNAI; and a Cloud Identifier, ID.

Embodiment 14

The method of any of embodiments 9-13 wherein the method further comprises, after receiving the list of AS locations and before sending the traffic routing recommendation: sending, to a SO function of the ONAP, a UPF onboarding recommendation for requesting the ONAP to deploy a UPF in a cloud infrastructure; and receiving a response to the UPF onboarding recommendation indicating that the UPF is to be deployed or that the UPF is not to be deployed, wherein an indication that the UPF is to be deployed comprises a UPF-ID that identifies a UPF and an operation ID that identifies a UPF deployment operation.

Embodiment 15

The method of any of embodiments 9-14 wherein the method further comprises, after receiving the list of AS locations and before selecting the UPF: sending, to the SO function of the ONAP, an AS onboarding recommendation for requesting the ONAP to deploy an AS in a cloud infrastructure; and receiving, from the SO function, a response to the AS onboarding recommendation indicating that the AS is to be deployed or that the AS is not to be deployed, wherein an indication that the AS is to be deployed comprises an AS-ID that identifies an AS and an operation ID that identifies an AS deployment operation.

Embodiment 16

The method of any of embodiments 9-15 wherein the method further comprises, after receiving the list of AS locations and before selecting the UPF: sending, to the DCAE function, a request to get load information about one or more UPFs; and receiving, from the DCAE function, load information for the one or more UPFs, wherein the sent traffic routing recommendation is additionally based on the UPF load information.

Embodiment 17

A method performed by a Front End node for receiving patterns extracted from events and current network status data in a telecommunications network, the method comprising: receiving, from a SO function of an ONAP, a request for an AS onboarding recommendation, the request identifying an application; sending, to a DCAE function, of the ONAP, a request for status of one or more identified User Plane Functions, UPFs; receiving, from the DCAE function, the status for the one or more identified UPFs; determining an optimal number of AS and AS locations based on the identified application's users' mobility patterns and QoS requirements; and sending, to the SO function, an AS onboarding recommendation, the AS onboarding recommendation including a list of AS locations.

Embodiment 18

The method of embodiment 17 wherein each AS location comprises a DNAI and/or a Cloud Identifier, ID.

Embodiment 19

The method of embodiment 17 or 18 further comprising, prior to determining the optimal number of AS and AS locations: sending, to the SO function, a UPF onboarding recommendation message comprising a Cloud-ID or DNAI; and receiving from the SO function, an indication that the UPF is to be deployed or that the UPF is not to be deployed, wherein an indication that the UPF is to be deployed comprises a UPF-ID that identifies a UPF.

Embodiment 20

A method performed by a Front End node for receiving patterns extracted from events and current network status data in a telecommunications network, the method comprising: sending, to a back-end function that collects data from NFs, and other sources and extracts patterns, a request to receive a pattern; and receiving the pattern from the back-end function.

Embodiment 21

The method of embodiment 20 wherein sending the request to receive a pattern comprises sending a pattern subscription request that identifies the pattern and specifies an update period and wherein receiving the identified pattern comprises receiving a pattern update notification after the specified update period.

Embodiment 22

The method of embodiment 20 wherein sending the request to receive a pattern comprises sending a pattern request that identifies the pattern, and wherein receiving the pattern comprises receiving a pattern response that includes the identified pattern.

Embodiment 23

A method of operation of a SMF, the method comprising: sending, to a Front End node that receives and analyses patterns of data collected from NFs and other sources, a request for a UPF selection recommendation for a user; receiving, from the Front End node, a UPF selection recommendation; and selecting a UPF based on the received UPF selection recommendation.

Embodiment 24

The method of embodiment 23 wherein the received UPF selection recommendation comprises at least one of: information identifying the user; information identifying a gNB; a list of at least one UPF; and a list of at least one DNAI.

Embodiment 25

The method of embodiment 23 or 24, further comprising receiving, from a SO function of an ONAP a UPF deployment completion message, and performing a UPF reselection.

Embodiment 26

The method of embodiment 25 wherein the UPF deployment completion message comprises information identifying a UPF deployment operation and information identifying a UPF.

Embodiment 27

The method of embodiment 23 or 24, further comprising receiving, from a SO function of an ONAP, an AS deployment completion message, and performing a UPF reselection.

Embodiment 28

A method of operation of a SMF, the method comprising: sending, to a Front End node that receives and analyses patterns of data collected from NF, and other sources, a request for a traffic routing recommendation; receiving, from the Front End node, a traffic routing recommendation; and selecting a UPF based on the received traffic routing recommendation.

Embodiment 29

The method of embodiment 28 wherein the received traffic routing recommendation comprises a list comprising at least one of: information identifying an application; information identifying a UPF; and information identifying a DNAI.

Embodiment 30

The method of embodiment 29 further comprising sending, to the identified UPF, rules for starting the identified application.

Embodiment 31

The method of embodiment 30 further comprising checking that the information identifying the application is mapped to a recommended UPF and DNAI.

Embodiment 32

The method of embodiment 31 further comprising performing a UPF reselection.

Embodiment 33

A method of operation of an ONAP, the method comprising: receiving, at a DCAE function of an ONAP, a request for a list of AS locations; and sending, by the DCAE function, a list of AS locations.

Embodiment 34

The method of embodiment 33 further comprising: receiving, at a SO function of the ONAP, a UPF onboarding recommendation for requesting the ONAP to deploy a UPF in a cloud infrastructure; and sending, by the SO function, a response to the UPF onboarding recommendation indicating that the UPF is to be deployed or that the UPF is not to be deployed, wherein an indication that the UPF is to be deployed comprises a UPF Identifier, ID, that identifies a UPF and an operation ID that identifies the UPF deployment operation.

Embodiment 35

The method of embodiment 33 or 34 further comprising: receiving, from a SO function of the ONAP, an AS onboarding recommendation for requesting the ONAP to deploy an AS in a cloud infrastructure; and sending, by the SO function, a response to the AS onboarding recommendation indicating that the AS is to be deployed or that the AS is not to be deployed, wherein an indication that the AS is to be deployed comprises an AS-ID that identifies an AS and an operation ID that identifies the AS deployment operation.

Embodiment 36

The method of any of embodiments 33-35 further comprising: receiving, at the DCAE function, a request to get load information about one or more UPFs; and sending, by the DCAE function, load information for the one or more UPFs.

Embodiment 37

The method of any of embodiments 33-36 further comprising sending, from the SO function, a UPF deployment completion message comprising information identifying a UPF deployment operation and information identifying a UPF or an AS deployment completion message.

Embodiment 38

The method of any of embodiments 33-36 further comprising sending, from the SO function, an AS deployment completion message comprising information identifying an AS deployment operation, information identifying a DNAI and information identifying an application.

Embodiment 39

A method of operation of an ONAP, the method comprising: sending, from a SO function of the ONAP, a request for an AS onboarding recommendation, the request identifying an application; receiving, at a DCAE function of the ONAP, a request for status of one or more identified UPFs; sending, by the DCAE function, the status for the one or more identified UPFs; and receiving, at the SO function, an AS onboarding recommendation, the recommendation including a list of AS locations.

Embodiment 40

The method of embodiment 39 wherein each AS location comprises a DNAI and/or a Cloud Identifier, ID.

Embodiment 41

The method of embodiment 39 or 40 further comprising: receiving, at the SO function, a UPF onboarding recommendation message comprising a Cloud-ID or DNAI; and sending by the SO function, an indication that the UPF is to be deployed or that the UPF is not to be deployed, wherein an indication that the UPF is to be deployed comprises a UPF-ID that identifies a UPF.

Embodiment 42

A Front End node for receiving patterns extracted from events and current network status data in a telecommunications network, the Front End node comprising: one or more processors; and memory storing instructions executable by the one or more processors, whereby the Front End node is operable to perform the method of any of embodiments 1-22.

Embodiment 43

A Session Management Function, SMF, comprising: one or more processors; and memory storing instructions executable by the one or more processors, whereby the Front End node is operable to perform the method of any of embodiments 23-32.

Embodiment 44

An ONAP comprising: one or more processors; and memory storing instructions executable by the one or more processors, whereby the Front End node is operable to perform the method of any of embodiments 33-41.

Embodiment 45

A system for providing ONAP-5GC interaction for analytics, the system comprising: at least one telecommunication NF comprising logic that captures events and network status data; a back-end function comprising circuitry that collects events and network status data from the at least one telecommunication NF and determines patterns within the collected data; and a Front End function comprising circuitry that receives the patterns from the back-end function and provides feedback and recommendations to a telecommunication network based on analysis of the received patterns.

Embodiment 46

The system of embodiment 45 wherein the back-end function is a component of a NWDAF.

Embodiment 47

The system of embodiment 45 or 46 wherein the Front End function is a component within the at least one telecommunication NF.

Embodiment 48

The system of embodiment 47 wherein the Front End function has access to the events and network status data captured by the at least one telecommunication NE.

Embodiment 49

The system of embodiment 45 or 46 wherein the Front End function is collocated with the back-end function.

Embodiment 50

The system of embodiment 49 wherein the Front End function has access to the data collected by the back-end function.

At least some of the following abbreviations may be used in this disclosure. If there is an inconsistency between abbreviations, preference should be given to how it is used above. If listed multiple times below, the first listing should be preferred over any subsequent listing(s).
3GPP Third Generation Partnership Project
5G Fifth Generation
5GC Fifth Generation Core Network
ACK Acknowledgement
AF Application Function
AMF Access and Mobility Management Function
AN Access Network
AP Access Point
AS Application Server
ASIC Application Specific Integrated Circuit
AUSF Authentication Server Function
CPU Central Processing Unit
DCAE Data Collection, Analytics, and Events
DN Data Network
DNAI Data Network Access Identifier
DNN Data Network Name
DSP Digital Signal Processor
EC Edge Cloud
eNB Enhanced or Evolved Node B
FPGA Field Programmable Gate Array
FQDN Fully Qualified Domain Name
gNB New Radio Base Station
H-PLMN Home Public Land Mobile Network
ID Identifier
IP Internet Protocol
LCM Life Cycle Management
LTE Long Term Evolution
MME Mobility Management Entity
MTC Machine Type Communication
NEF Network Exposure Function
NF Network Function
NOK Not OK
NR New Radio
NRF Network Repository Function
NSSF Network Slice Selection Function
NWDAF Network Data Analytics Function
OA&M Operation, Administration, and Maintenance
OAM Operation and Maintenance
OCS Online Charging System
ONAP Open Network Automation Platform
OTT Over-the-Top
PCC Policy and Charging Control
PCF Policy Control Function
PDU Protocol Data Unit
P-GW Packet Data Network Gateway
PLMN Public Land Mobile Network
QoS Quality of Service
RAM Random Access Memory
RAN Radio Access Network
ROM Read Only Memory
RRH Remote Radio Head
RTT Round Trip Time
SBA Service-Based Architecture
SCEF Service Capability Exposure Function
SMF Session Management Function
S-NSSAI Single Network Slice Selection Assistance Information
SO Service Orchestrator
SSC Session and Service Community
TS Technical Specification
UDM Unified Data Management
UDR User Data Repository
UE User Equipment
UPF User Plane Function
VM Virtual Machine
VNF Virtual Network Function
V-PLMN Visited Public Land Mobile Network Those skilled in the art will recognize improvements and modifications to the embodiments of the present disclosure. All such improvements and modifications are considered within the scope of the concepts disclosed herein.

What is claimed is:

1. A method performed by a Front End node for receiving patterns extracted from events and current network status data in a telecommunications network, the method comprising:
    receiving, from a Session Management Function, SMF, a request for a User Plane Function, UPF, selection recommendation for a user;
    determining a list of applications associated with the user;
    sending, to a Data Collection, Analytics, and Events, DCAE, function of an Open Network Automation Platform, ONAP, a request for a list of Application Server, AS, locations for ASs of applications comprised in the list of applications associated with the user;
    receiving, from the DCAE function, the list of AS locations for the ASs of the applications comprised in the list of applications associated with the user;
    selecting a UPF based on the list of AS locations for the ASs of the applications comprised in the list of applications associated with the user and mobility and application usage patterns of the user; and sending, to the SMF, a recommendation identifying the selected UPF.

2. The method of claim 1 wherein the Front End node performing the method comprises a Network Data Analytics Function, NWDAF, or a Network Function, NF, other than a NWDAF.

3. The method of claim 1 wherein the received request for the UPF selection recommendation comprises at least one of:
   information identifying the user;
   information identifying a New Radio Base Station, gNB;
   a list of at least one UPF; and
   a list of at least one Data Network Access Identifier, DNAI.

4. The method of claim 1 wherein the sent request for the list of AS locations comprises a list identifying at least one application associated with the user.

5. The method of claim 1 wherein the received list of AS locations comprises at least one of:
   information identifying an application;
   information identifying an AS;
   information identifying an AS location;
   a DNAI; and
   a Cloud Identifier, ID.

6. The method of claim 1 wherein the method further comprises, after receiving the list of AS locations and before selecting the UPF:
   sending, to a Service Orchestrator, SO, function of the ONAP, a UPF onboarding recommendation for requesting the ONAP to deploy a UPF in a cloud infrastructure; and
   receiving a response to the UPF onboarding recommendation indicating that the UPF is to be deployed or that the UPF is not to be deployed, wherein an indication that the UPF is to be deployed comprises a UPF-ID that identifies a UPF and an operation ID that identifies a UPF deployment operation.

7. The method of claim 1 wherein the method further comprises, after receiving the list of AS locations and before selecting the UPF:
   sending, to the SO function of the ONAP, an AS onboarding recommendation for requesting the ONAP to deploy an AS in a cloud infrastructure; and
   receiving, from the SO function, a response to the AS onboarding recommendation indicating that the AS is to be deployed or that the AS is not to be deployed, wherein an indication that the AS is to be deployed comprises an AS-ID that identifies an AS and an operation ID that identifies the AS deployment operation.

8. The method of claim 1 wherein the method further comprises, after receiving the list of AS locations and before selecting the UPF:
   sending, to the DCAE function, a request to get load information about one or more UPFs; and
   receiving, from the DCAE function, the load information for the one or more UPFs,
   wherein the UPF selection is additionally based on the load information for the one or more UPFs.

9. A method performed by a Front End node for receiving patterns extracted from events and current network status data in a telecommunications network, the method comprising:
   receiving, from a Session Management Function, SMF, a request for a traffic routing recommendation for a user;
   determining a list of applications associated with the user;
   sending, to a Data Collection, Analytics, and Events, DCAE, function of an Open Network Automation Platform, ONAP, a request for a list of Application Server, AS, locations for applications comprised in the list of the applications associated with the user;
   receiving, from the DCAE function, the list of AS locations for the applications comprised in the list of applications associated with the user;
   selecting, for each application, a User Plane Function, UPF, and Data Network Access Identifier, DNAI, based on the list of AS locations for the applications comprised in the list of applications associated with the user and mobility and application usage patterns of the user; and
   sending, to the SMF, the traffic routing recommendation comprising a list that maps each application to a recommended UPF and DNAI.

10. The method of claim 9 wherein the Front End node performing the method comprises a Network Data Analytics Function, NWDAF, or a Network Function, NF, other than a NWDAF.

11. The method of claim 9 wherein the received request for the traffic routing recommendation for the user comprises at least one of:
    information identifying the user; and
    information identifying a New Radio Base Station, gNB.

12. The method of claim 9 wherein the sent request for the list of AS locations comprises a list identifying at least one application associated with the user.

13. The method of claim 9 wherein the received list of AS locations comprises at least one of:
    information identifying an application;
    information identifying an AS;
    information identifying an AS location;
    a DNAI; and
    a Cloud Identifier, ID.

14. The method of claim 9 wherein the method further comprises, after receiving the list of AS locations and before sending the traffic routing recommendation:
    sending, to a Service Orchestrator, SO, function of the ONAP, a UPF onboarding recommendation for requesting the ONAP to deploy a UPF in a cloud infrastructure; and
    receiving a response to the UPF onboarding recommendation indicating that the UPF is to be deployed or that the UPF is not to be deployed, wherein an indication that the UPF is to be deployed comprises a UPF-ID that identifies a UPF and an operation ID that identifies a UPF deployment operation.

15. The method of claim 9 wherein the method further comprises, after receiving the list of AS locations and before selecting the UPF:
    sending, to the SO function of the ONAP, an AS onboarding recommendation for requesting the ONAP to deploy an AS in a cloud infrastructure; and
    receiving, from the SO function, a response to the AS onboarding recommendation indicating that the AS is to be deployed or that the AS is not to be deployed, wherein an indication that the AS is to be deployed comprises an AS-ID that identifies an AS and an operation ID that identifies an AS deployment operation.

16. The method of claim 9 wherein the method further comprises, after receiving the list of AS locations and before selecting the UPF:
    sending, to the DCAE function, a request to get load information about one or more UPFs; and receiving, from the DCAE function, the load information for the one or more UPFs,
wherein the sent traffic routing recommendation is additionally based on the load information for the one or more UPFs.

17. A method performed by a Front End node for receiving patterns extracted from events and current network status data in a telecommunications network, the method comprising:
   receiving, from a Service Orchestrator, SO, function of an Open Network Automation Platform, ONAP, a request for an Application Server, AS, onboarding recommendation, the request identifying an application;
   sending, to a Data Collection, Analytics, and Events, DCAE, function, of the ONAP, a request for status of one or more identified User Plane Functions, UPFs;
   receiving, from the DCAE function, the status of the one or more identified UPFs;
   determining an optimal number of AS and AS locations based on the status of the one or more identified UPFs and mobility patterns and Quality of Service, QoS, requirements of users of the identified application; and
   sending, to the SO function, an AS onboarding recommendation, the AS onboarding recommendation including a list of AS locations in accordance with the determined optimal number of AS and AS locations.

18. The method of claim 17 wherein each AS location comprises a Data Network Access Identifier, DNAI, and/or a Cloud Identifier, ID.

19. The method of claim 17 further comprising, prior to determining the optimal number of AS and AS locations:
   sending, to the SO function, a UPF onboarding recommendation message comprising a Cloud-ID or DNAI; and
   receiving from the SO function, an indication that the UPF is to be deployed or that the UPF is not to be deployed, wherein an indication that the UPF is to be deployed comprises a UPF-ID that identifies a UPF.

20. A method of operation of a Session Management Function, SMF, the method comprising:
   sending, to a Front End node that receives and analyses patterns of data collected from Network Functions, NFs, and other sources, a request for a User Plane Function, UPF, selection recommendation for a user;
   receiving, from the Front End node, a UPF selection recommendation; and
   selecting a UPF based on the received UPF selection recommendation.

21. The method of claim 20 wherein the received UPF selection recommendation comprises at least one of:
   information identifying the user;
   information identifying a New Radio Base Station, gNB;
   a list of at least one UPF; and
   a list of at least one Data Network Access Identifier, DNAI.

22. The method of claim 20, further comprising receiving, from a Service Orchestrator, SO, function of an Open Network Automation Platform, ONAP, a UPF deployment completion message, and performing a UPF reselection.

* * * * *